US010877796B1

(12) United States Patent
Kinney, Jr. et al.

(10) Patent No.: US 10,877,796 B1
(45) Date of Patent: Dec. 29, 2020

(54) JOB EXECUTION WITH SCHEDULED RESERVED COMPUTE INSTANCES

(71) Applicant: Amazon Technologies, Inc., Seattle, WA (US)

(72) Inventors: James Edward Kinney, Jr., Seattle, WA (US); Dougal Stuart Ballantyne, Seattle, WA (US); Nishant Mehta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1023 days.

(21) Appl. No.: 15/195,890

(22) Filed: Jun. 28, 2016

(51) Int. Cl.
| | | |
|---|---|---|
| G06F 9/46 | (2006.01) | |
| G06F 9/48 | (2006.01) | |
| G06F 9/50 | (2006.01) | |
| H04L 29/08 | (2006.01) | |

(52) U.S. Cl.
CPC .......... *G06F 9/4843* (2013.01); *G06F 9/4881* (2013.01); *G06F 9/5027* (2013.01); *H04L 67/10* (2013.01)

(58) Field of Classification Search
CPC .... G06F 9/4881; G06F 9/4843; G06F 9/5027; H04L 67/10
See application file for complete search history.

(56) References Cited

U.S. PATENT DOCUMENTS

| | | | |
|---|---|---|---|
| 5,793,747 A * | 8/1998 | Kline | H04L 12/5602 370/230 |
| 7,356,770 B1 | 4/2008 | Jackson | |
| 8,249,904 B1 * | 8/2012 | DeSantis | G06F 9/5088 705/7.12 |
| 8,321,871 B1 * | 11/2012 | Jackson | G06F 9/5005 718/104 |
| 8,418,186 B2 | 4/2013 | Jackson | |
| 8,782,120 B2 | 7/2014 | Jackson | |
| 8,782,246 B2 | 7/2014 | Jackson | |
| 9,116,731 B2 | 8/2015 | Tung et al. | |

(Continued)

OTHER PUBLICATIONS

U.S. Appl. No. 15/360,948, filed Nov. 23, 2016, Dougal Stuart Ballantyne, et al.

(Continued)

*Primary Examiner* — Jorge A Chu Joy-Davila
(74) *Attorney, Agent, or Firm* — Robert C. Kowert; Kowert, Hood, Munyon, Rankin & Goetzel, P.C

(57) ABSTRACT

Methods, systems, and computer-readable media for job execution with scheduled reserved compute instances are disclosed. One or more queues are mapped to a compute environment. The queue(s) are configured to store data indicative of jobs. The compute environment is associated with one or more scheduled reserved compute instances, and the one or more scheduled reserved compute instances are reserved for use in the compute environment for a window of time. The queue(s) are mapped to the compute environment prior to the window of time opening. During the window, at least one of the scheduled reserved compute instances is added to the compute environment. The scheduled reserved compute instance(s) are provisioned from a pool of available compute instances. During the window, execution is initiated of one or more jobs from the queue(s) on the scheduled reserved compute instance(s) in the compute environment.

20 Claims, 15 Drawing Sheets

(56) References Cited

U.S. PATENT DOCUMENTS

| | | | |
|---|---|---|---|
| 9,215,190 B2 | 12/2015 | Tung et al. | |
| 9,239,996 B2 | 1/2016 | Moorthi et al. | |
| 2004/0117791 A1* | 6/2004 | Prasad | G06F 9/4881 718/100 |
| 2008/0127193 A1* | 5/2008 | Ishisaka | G06F 9/4881 718/103 |
| 2012/0110589 A1 | 5/2012 | Ghosh et al. | |
| 2013/0179881 A1* | 7/2013 | Calder | G06F 9/5072 718/1 |
| 2013/0283273 A1* | 10/2013 | Miyazaki | G06F 9/45533 718/1 |

OTHER PUBLICATIONS

Dougal Ballantyne, "cfncluster 0.0.22", Retrieved from URL: https://pypi.python.org/pypi/cfncluster/0.0.22 on Aug. 4, 2015, p. 1.

"IBM Platform Computing Solutions", International Technical Support Organization, Retrieved from URL: http://www.redbooks.ibm.com/abstracts/sg248081.html?Open, Mar. 2013, pp. 1-142.

"Quick Start User Guide", Slurm Version 16.05, Mar. 2016, Retrieved from URL: http://slurm.schedmd.com/quickstart.html, pp. 1-7.

Chris Dagdigian, "Which Grid Engine?", Bio-IT World, Feb. 2012, Retrieved from URL: http://www.bio-itworld.com/2012/02/15/which-grid-engine.html. pp. 1-3.

U.S. Appl. No. 15/195,893, filed Jun. 28, 2016, James Edward Kinney Jr., et al.

* cited by examiner

JOB EXECUTION WITH SCHEDULED RESERVED COMPUTE INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. The use of virtualization with cloud computing resources to run client programs may enable some clients to access a much greater amount of computing capacity at a given time than would be possible with the clients' on-premises resources.

Figure 1:
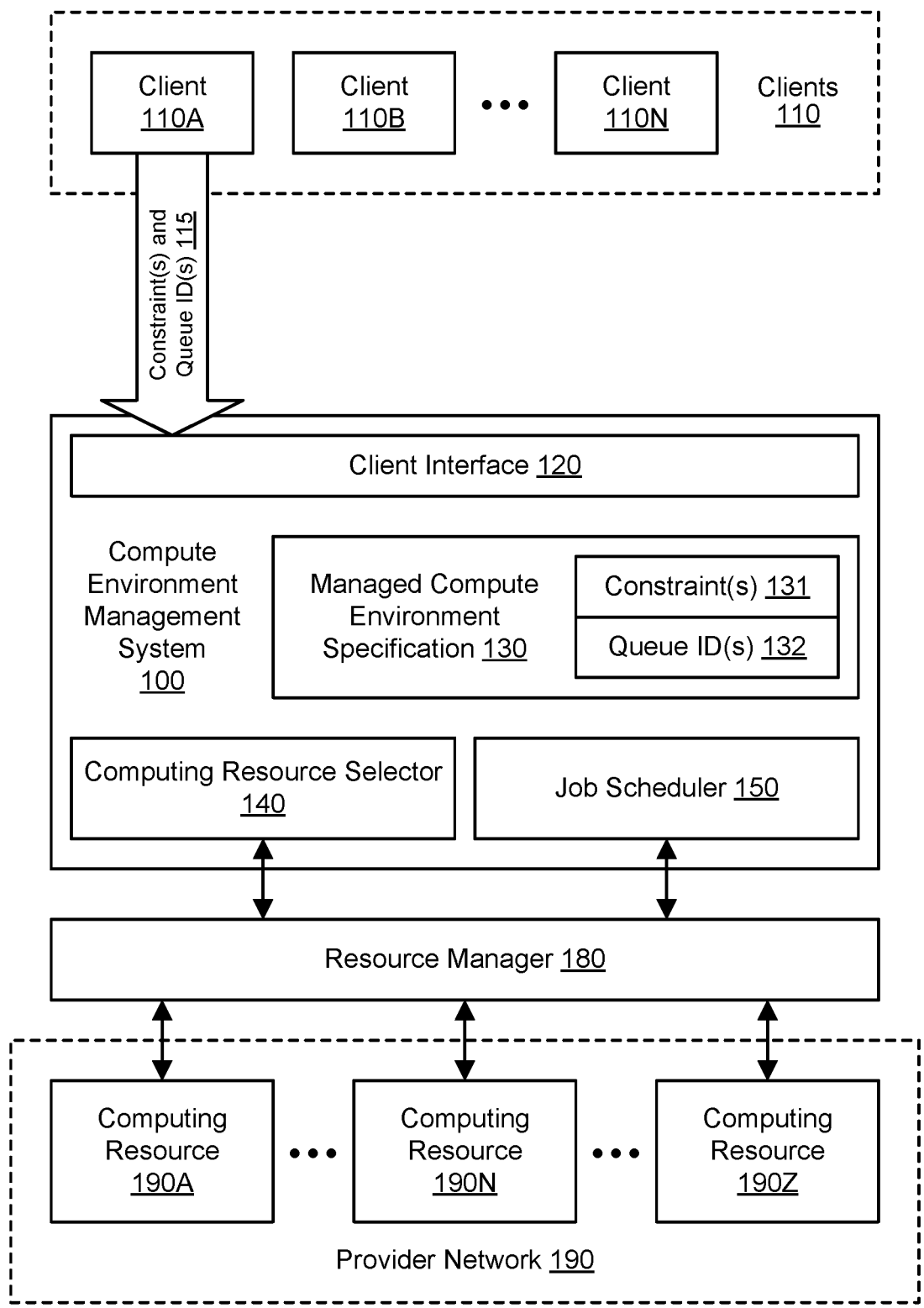
FIG. 1 illustrates an example system environment for job execution with managed compute environments, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for job execution with managed compute environments are described. Using the techniques described herein, a client of a provider network may select to use a managed compute environment and may specify one or more constraints for the environment. The constraints may be associated with computing resources, including compute instances, and may be defined or approved by a user. For example, a managed compute environment may be associated with a constraint specifying one or more compute instance types that are recommended for and/or usable within the environment, a constraint specifying a minimum number of virtual CPUs or compute instances, a constraint specifying a maximum number of virtual CPUs or compute instances, a constraint specifying a maximum cost per compute instance, a constraint specifying an aggregate budget for compute instances, a constraint specifying the source of compute instances (e.g., a spot market, an on-demand market, scheduled reserved instances, and so on), a constraint specifying other types of resources such as storage, and/or other suitable constraints. One or more job queues may be associated with the managed compute environment. A compute environment management system may monitor the queue(s) and dynamically manage the computing resources in the managed compute environment based (at least in part) on the contents of the queue(s). To execute a particular job in the queue(s), the system may automatically select and reserve a compute instance from a pool of available computing resources of a provider network. The instance may be selected based (at least in part) on any requirements associated with the job and/or on the constraint(s) for the managed compute environment. In some circumstances, the instance may be automatically deprovisioned and returned to the pool of available computing resources upon completion of the job. In this manner, computing resources in a compute environment may be provisioned according to user-defined constraints and then used efficiently with automatic and programmatic management techniques.

Various embodiments of methods, systems, and computer-readable media for job execution with scheduled reserved compute instances are described. Using the techniques described herein, scheduled reserved compute instances may be managed automatically on behalf of a user during a window of time for which the instances are reserved. One or more scheduled reserved compute instances may be associated with a compute environment such as a managed compute environment, e.g., based on user input. One or more job queues may also be associated with the compute environment, e.g., based on a mapping provided by a user. Jobs may be added to the queue(s) before and during the window of time. When the window of time opens, one or more of the scheduled reserved compute instances may be auto-launched and added to the compute environment, e.g., by a compute environment management system. The scheduled reserved compute instances may be provisioned from a pool of available compute instances of a multi-tenant provider network. Jobs from the queue(s) may be assigned to the scheduled reserved compute instances for execution during the window of time. The scheduled reserved compute instances may be automatically deprovisioned and removed from the compute environment when the window of time closes. Queues may differ in priority so that lower priority jobs can be assigned to reserved instances when higher priority jobs are not available. In this manner, scheduled reserved compute instances may be used efficiently during a window of time with automatic and programmatic management.

Job Execution with Managed Compute Environments

FIG. 1 illustrates an example system environment for job execution with managed compute environments, according to one embodiment. A compute environment management system 100 may manage various compute environments on behalf of clients. Based (at least in part) on configuration information provided by clients, such as constraints for computing resources in managed compute environments and queues mapped to those environments, the compute environment management system 100 may automatically provision and deprovision computing resources for the managed compute environments. Within user-defined constraints, the compute environment management system 100 may automatically grow or shrink a particular managed compute environment to meet the requirements of jobs that the user expects to be executed in the environment.

The compute environment management system 100 may include a client interface 120 that permits interaction with the clients 110A-110N, e.g., such that the client can submit configuration information for managed compute environments. Using the client interface 120, the compute environment management system 100 may receive input 115 from a particular client 110A. The input 115 may represent user input and/or input generated programmatically. The input 115 may specify or reference one or more constraints and/or one or more queue identifiers for a particular compute environment. Based (at least in part) on the input 115, the compute environment management system 100 may generate a managed compute environment specification 130 for a managed compute environment associated with the client 110A. The managed compute environment specification 130 may include the one or more constraints 131 indicated by the client 110A and also the queue identifier(s) 132 that reference one or more job queues.

The managed compute environment specification 130 may also include additional metadata or configuration data usable for managing a set of computing resources. The additional metadata or configuration data may represent other properties or attributes of the managed compute environment or its constituent resources. For example, the managed compute environment specification 130 may associate particular labels (including alphanumeric labels) with particular resources for ease of resource management. As another example, the managed compute environment specification 130 may include data associating a managed compute environment with a virtual private cloud (VPC) representing a virtual network, e.g., within the provider network 190. The VPC may be isolated from other resources and VPCs within the provider network 190 and may have its own range of IP addresses referred to as a subnet; resources in the managed compute environment may be launched into the subnet.

The compute environment management system 100 may include a computing resource selector component 140. Using the computing resource selector 140, the compute environment management system 100 may select and reserve (by interacting with the resource manager 180) one or more of the computing resources 190A-190N of a provider network 190 for a particular compute environment associated with a particular client. The compute environment management system 100 may also include a job scheduler component 140. Using the job scheduler 150, the compute environment management system 100 may receive jobs from a client (e.g., the same client 110A that configured the managed compute environment) and cause those jobs to be executed using the computing resources in the managed compute environment. The job scheduler 150 may implement the one or more queues associated with the queue identifier(s) 132. The job scheduler 150 may determine a time at which to initiate execution of a particular job within a managed compute environment associated with the client that provided the job. In one embodiment, the job scheduler 150 and/or computing resource selector 140 may determine one or more particular computing resources with which to initiate execution of a particular job within a managed compute environment associated with the client that provided the job.

The client devices 110A-110N may represent or correspond to various clients, users, or customers of the compute environment management system 100 and of the provider network 190. The clients, users, or customers may represent individual persons, businesses, other organizations, and/or other entities. The client devices 110A-110N may be distributed over any suitable locations or regions. Each of the client devices 110A-110N may be implemented using one or more computing devices, any of which may be implemented by the example computing device 3000 illustrated in FIG. 12. The clients 110A-110N may be coupled to the compute environment management system 100 via one or more networks, potentially including the Internet. Although three clients 110A, 110B, and 110N are shown for purposes of illustration and example, it is contemplated that any suitable number and configuration of client devices may be used to provide configuration information and jobs to the compute environment management system 100 and provider network 190.

The client devices 110A-110N may encompass any type of client configurable to submit configuration information to the compute environment management system 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may interact with the client interface 120 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 110A-110N may be configured to generate network-based service requests according to a Representational State Transfer (REST)-style network-based services architecture, a document- or message-based network-based services architecture, or another suitable network-based services architecture. In some embodiments, one of the client devices 110A-110N may be configured with access to a virtual compute instance in the provider network 190 in a manner that is transparent to applications implement on the client device utilizing computational resources provided by the virtual compute instance. In at least some embodiments, client devices 110A-110N may provision, mount, and configure storage volumes implemented at storage services within the provider network 190 for file systems implemented at the client devices.

Client devices 110A-110N may convey network-based service requests to the compute environment management system network 100 via one or more networks. In various embodiments, the network(s) may encompass any suitable combination of networking hardware and protocols necessary to establish network-based communications between client devices 110A-110N and compute environment management system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the compute environment management system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the compute environment management system 100. It is noted that in some embodiments, client devices 110A-110N may communicate with compute environment management system 100 using a private network rather than the public Internet.

The provider network 190 may include a plurality of computing resources such as resources 190A through 190N through 190Z. The resources may include compute instances, storage instances, and so on. The resources offered by the compute environment 190 may vary in type, configuration, availability, cost, and other characteristics. For example, the provider network may include a set of compute instances (physical compute instances and/or virtual compute instances) of different compute instance types, where the compute instance types may vary in the capabilities and features of their processor resources, memory resources, storage resources, network resources, and so on, and potentially in their cost as well. When not in use by clients, the computing resources 190A-190Z may belong to a pool of available computing resources. The resource manager 180 may reserve and provision individual ones of the resources 190A-190Z for individual clients. The resource manager 180 may also deprovision individual ones of the resources 190A-190Z and return them to the pool of available resources of the provider network 190. Although three computing resources 190A, 190N, and 190Z are shown for purposes of illustration and example, it is contemplated that any suitable number and configuration of computing resources may be used to execute jobs in a compute environment managed by the compute environment management system 100. It is contemplated that the provider network 190 may include additional components not shown, fewer components than shown, or different combinations, configurations, or quantities of the components shown.

A network set up by an entity such as a company or a public sector organization to provide one or more services (such as various types of network-accessible computing or storage) accessible via the Internet and/or other networks to a distributed set of clients may be termed a provider network. A provider network such as network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. For example, virtual compute instances in the multi-tenant provider network 190 may be concurrently used for the processing of jobs by client 110A as well as by client 110B.

In some embodiments, an operator of the provider network 190 may implement a flexible set of resource reservation, control, and access interfaces for their clients. For example, the resource manager 180 may implement a programmatic resource reservation interface (e.g., via a web site or a set of web pages) that allows clients and/or other components such as the system 190 to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager 180 and may be allocated to some other client that is willing to pay a higher price. Other purchasing modes or combinations of modes may be implemented by the resource manager 180 in some embodiments.

In one embodiment, the provider network 190 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the resource manager 180, an instance type may be selected for a job, e.g., based (at least in part) on input from the client. For example, a client may choose an instance type from a predefined set of instance types. As another example, a client may specify the desired resources of an instance type for a job, and the resource manager 180 may select an instance type based on such a specification.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Configurations of virtual compute instances may also include their location in a particular data center or availability zone, geographic location, and (in the case of reserved compute instances) reservation term length.

Figure 12:
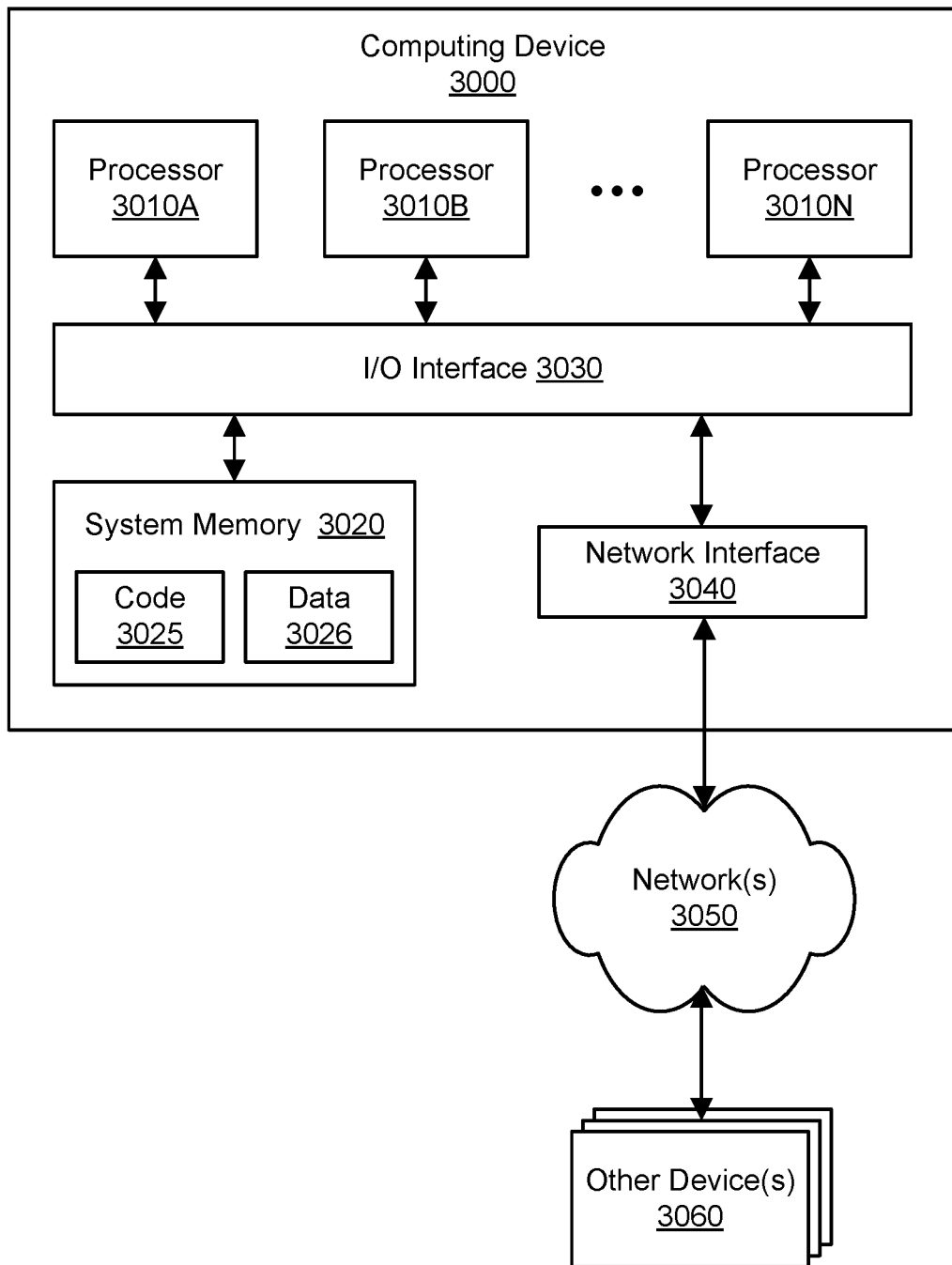
FIG. 12 illustrates an example computing device that may be used in some embodiments.

The compute environment management system 100 may include a plurality of computing devices, any of which may be implemented by the example computing device 3000 illustrated in FIG. 12. In various embodiments, portions of the described functionality of the compute environment management system 100 may be provided by the same computing device or by any suitable number of different computing devices. If any of the components of the compute environment management system 100 are implemented using different computing devices, then the components and their respective computing devices may be communicatively coupled, e.g., via a network. Each of the illustrated components may represent any combination of software and hardware usable to perform their respective functions. It is contemplated that the compute environment management system 100 may include additional components not shown, fewer components than shown, or different combinations, configurations, or quantities of the components shown.

Figure 2:
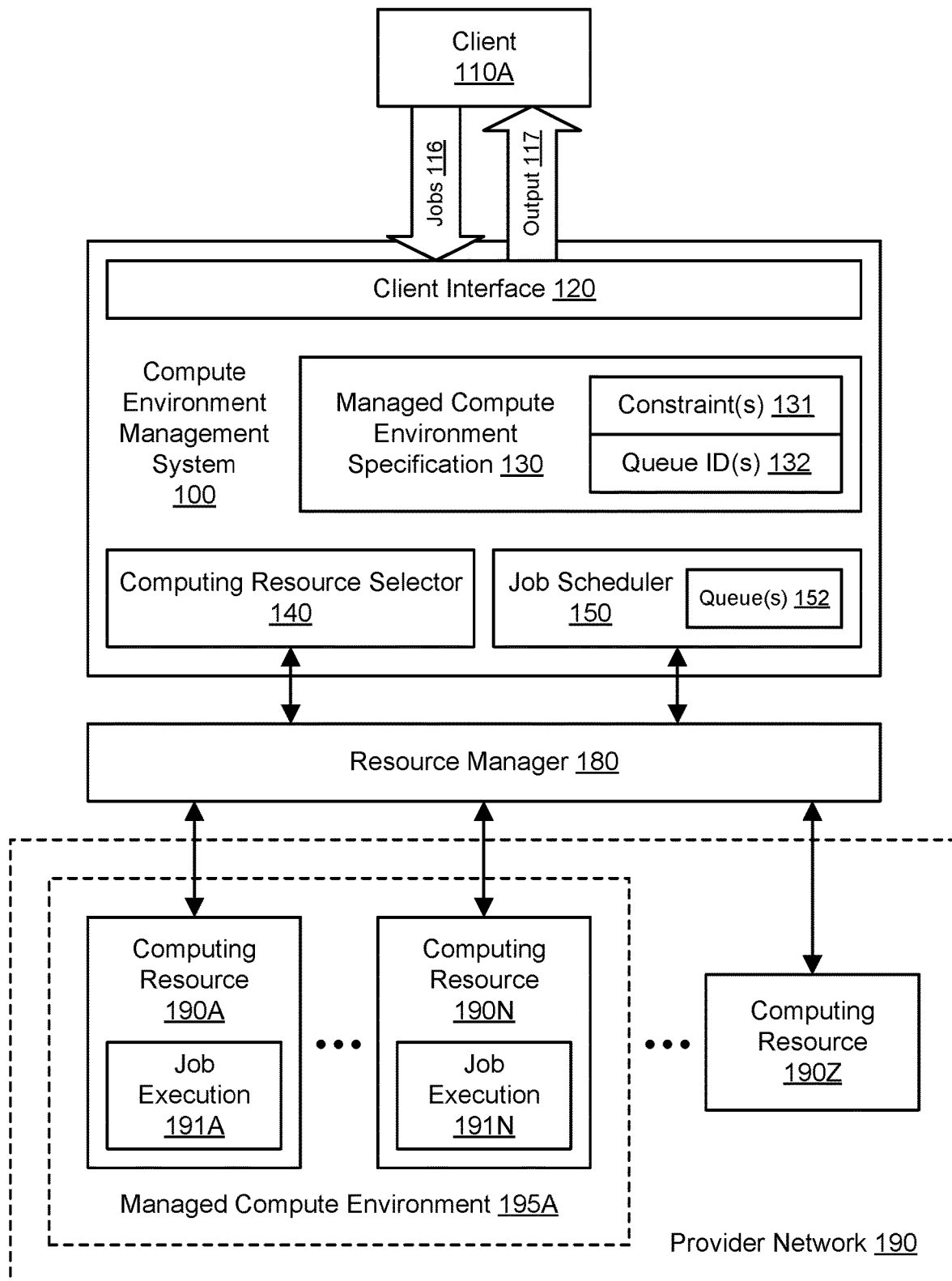
FIG. 2 illustrates further aspects of the example system environment for job execution with managed compute environments, including automatic allocation of computing resources in a managed computing environment from resources of a provider network, according to one embodiment.

FIG. 2 illustrates further aspects of the example system environment for job execution with managed compute environments, including automatic allocation of computing resources in a managed computing environment from resources of a provider network, according to one embodiment. As discussed above, based (at least in part) on the input from a client, the compute environment management system 100 may generate a managed compute environment specification 130 for a managed compute environment associated 195A with the client 110A. The managed compute environment specification 130 may include the one or more constraints 131 indicated by the client 110A and also the queue identifier(s) 132 of one or more job queues 152.

In generating a specification 130 of the managed compute environment 195A, one or more constraints 131 for the environment may be received from the user, approved by the user, and/or defined based (at least in part) on default policies. The constraint(s) 131 may be associated with computing resources, including compute instances, and may be defined or approved by a user. For example, the managed compute environment 195A may be associated with a constraint specifying one or more compute instance types that are recommended for and/or usable within the environment. As another example, the managed compute environment 195A may be associated with a constraint specifying a minimum number of virtual processing units (e.g., CPUs or GPUs) or compute instances and/or a constraint specifying a maximum number of virtual processing units or compute instances. As a further example, the managed compute environment 195A may be associated with a constraint specifying the source of compute instances, e.g., a spot market for instances that are less expensive but without guaranteed availability, an on-demand market for instances that are more expensive but with guaranteed availability, scheduled reserved instances for a window of time, and so on. The managed compute environment 195A may be associated with cost-related constraints such as a constraint specifying a maximum cost per compute instance (e.g., a maximum bid for the spot market as a percentage of on-demand pricing) and/or a constraint specifying a maximum aggregate budget for compute instances. In some embodiments, the managed compute environment 195A may be associated with a constraint specifying other types of resources such as storage resources and/or other suitable constraints.

Subject to the constraint(s) 131, the compute environment management system 100 may automatically manage the aggregate computing resources 190A-190N within a managed compute environment 195A based (at least in part) on analysis of one or more job queue(s) 152. Based on automated analysis of the job queue(s) 152, the compute environment management system 100 may determine that a particular set of compute instances are required to execute the flow of jobs through the queue(s). The compute environment management 100 system may provision and reuse a set of compute instances 190A-190N to meet the aggregate demand of the jobs within the constraints 131 associated with the managed compute environment 195A. Within the environmental constraints 131, the set of computing resources for a managed compute environment 195A may be automatically increased or decreased in number or otherwise changed in composition based on automated analysis of the job queue(s) by the compute environment management system 100. If a computing resource has been purchased for an hour, the compute environment management system 100 may attempt to use that resource for one job after another (and potentially for multiple jobs running concurrently) for the entire hour rather than simply terminating the resource after one job. In other cases, the compute environment management system 100 may provision additional resources if the constraint(s) 131 permit. In one embodiment, the compute environment management system 100 may use machine learning techniques (e.g., based on the job execution history for one or more clients) to recommend or automatically implement optimized usage of resources within a managed compute environment. In one embodiment, backend resources may be oversubscribed for cost efficiency. In this manner, the compute environment management system 100 may efficiently use a set of computing resources 190A-190N within a managed compute environment 195A having constraints 131 for the computing resources.

As discussed above, the provider network 190 may include a plurality of computing resources such as resources 190A through 190N through 190Z. The resources provisioned for the compute environment 195A may vary in type, configuration, availability, cost, location, and other characteristics. The resources 190A-190N may include compute instances, storage instances, and so on. Using the computing resource selector 140, the compute environment management system 100 may select and reserve (by interacting with the resource manager 180) one or more of the computing resources 190A-190N of a provider network 190 for a particular compute environment associated with a particular client. As shown in the example of FIG. 2, the computing resources 190A through 190N may be selected for and added to the managed compute environment 195A. The remaining computing resources (including resource 190Z) in the provider network 190 may remain in one or more pools of available resources or may be allocated to other clients or other compute environments. It is contemplated that the managed compute environment 195A may include additional components not shown, fewer components than shown, or different combinations, configurations, or quantities of the components shown.

The compute environment 195A may be part of a multi-tenant provider network 190 in which computing resources 190A-190N (e.g., compute instances, storage instances, and so on) may be provisioned from one or more pools of available resources. Alternatively, the provider network 190 may represent a client compute environment, e.g., a set of computing resources on premises managed by the client that submitted the jobs 116. A client compute environment may typically have more constrained resources than a multi-tenant provider network, and so the compute environment management system 100 as described herein may be especially useful for automatically managing resources on behalf of clients in a multi-tenant provider network.

Using the job scheduler 150, the compute environment management system 100 may receive jobs 116 from the client 110A and cause those jobs to be executed using computing resources in the managed compute environment 195A. The managed compute environment 195A may be associated with one or more job queues configured to hold jobs 116 for attempted execution within the environment. Although the example of one or more queues is discussed herein, it is contemplated that other types of data structures (e.g., workflows) may also be used to hold jobs for attempted execution within the managed compute environment. In some embodiments, the other data structures may be used to feed job queues, e.g., such that a job in a workflow is placed in a job queue when the job's dependencies are satisfied. The job scheduler 150 may implement or link to the one or more job queues 152 associated with the queue identifier(s) 132.

In one embodiment, multiple queues may be associated with different priority levels relative to one another. For example, a first queue may be configured to hold higher-priority jobs, while a second queue may be configured to hold lower-priority jobs that are offered to instances in the compute environment when the first queue is empty. The priorities may be defined or approved by the user with any suitable interface to the compute environment management system. In one embodiment, a queue may be mapped to more than one compute environment, and the compute environments may have different priorities relative to the queue. For example, a higher-priority queue may be mapped to a first compute environment (managed) and also to a second compute environment (managed or unmanaged). Jobs from the higher-priority queue may first be offered to the first compute environment; the jobs may be assigned to the other "overflow" compute environment only when the first compute environment lacks sufficient capacity to execute the jobs, e.g., due to a maximum number of instances or a maximum aggregate budget being met. In one embodiment, compute environments may have different priorities based (at least in part) on the source of computing resources for those environments. For example, a first compute environment may be sourced from a spot market that typically offers a lower price without guaranteed availability, while a second compute environment may be sourced from an on-demand market that typically offers a higher price with guaranteed availability. In one embodiment, different compute environments may include (based at least in part on their respective constraints) different types of compute instances, and the same queue may hold heterogeneous jobs that can be provided to either compute environment based on a mapping of the job definitions to resource characteristics.

One or more workloads of jobs 116 may be received from a client device 110A operated by or associated with the user (potentially part of a client organization). The jobs may be received in one batch or in multiple batches over a period of time. The jobs 116 may be received by the compute environment management system 100 through any appropriate client interface 120, potentially including one or more application programming interfaces (APIs), other programmatic interfaces, and/or user interfaces. The jobs 116 may be defined by one or more job definitions. A job definition may include or reference program instructions to be executed in processing the job. The job definition may include or be associated with a job identifier. A job definition may include or reference a set of input data to be processed using the program instructions. A job definition may also include or be provided with other suitable metadata, including timing information (e.g., a time to begin processing the workload, an anticipated time to run the workload, and/or a deadline), budgetary information, anticipated resource usage, and so on. A user of the client device 110A may access the compute environment management system 100 with a user account that is associated with an account name or other user identifier. The user may belong to an organization (e.g., a business entity) that is a client or customer of the compute environment management system 100, e.g., with an arrangement in place to pay fees for use of the compute environment management system and/or provider network 190. The user account may be controlled by an individual user or by multiple users within an organization.

The job scheduler 150 may determine a time at which to initiate execution of a particular job within the managed compute environment 195A associated with the client 110A that provided the job. A job may be scheduled for execution without delay or scheduled for execution at a later time. In one embodiment, the job scheduler 150 and/or computing resource selector 140 may determine one or more particular computing resources with which to initiate execution of a particular job within a managed compute environment 195A associated with the client 110A that provided the job. As shown in the example of FIG. 2, the computing resource 190A may include a compute instance that is configured with a capability for job execution 191A. Similarly, the computing resource 190N may include a compute instance that is configured with a capability for job execution 191N.

A compute instance may be selected for the job based (at least in part) on any requirements associated with the job and/or on the constraint(s) 131 for the managed compute environment 195A. For example, if the environment is constrained to a particular set of compute instance types, then the compute environment management system may provision a compute instance of one of those types. In one embodiment, jobs may be associated with job definitions that indicate requirements or recommendations for computing resources (e.g., processor requirements, storage requirements, memory requirements, network requirements, and so on) and/or the anticipated duration of job execution. The compute instance type may be selected from among the permissible or recommended types based (at least in part) on the job definition, e.g., based on usage requirements specified for the job. In this manner, different types of jobs with different requirements may be assigned by the compute environment management system 100 to different types of compute instances in the managed compute environment 195A.

Initiating the execution of a job may include the compute environment management system 100 interacting with a resource manager 180 to provision, configure, and launch one or more compute instances to run the job. Provisioning a resource may include reserving, configuring, and/or launching the resource. In a multi-tenant provider network, a compute instance may represent a virtual compute instance running on a physical compute instance, and the physical compute instance may be selected from a set of different instance types having different configurations or capabilities and potentially a different fee structure for usage. Each instance may be used for one or more jobs in the workload and then deprovisioned or reconfigured for use by the same user. In one embodiment, a container management system may be used with the virtual compute instances to deploy the program instructions supplied or otherwise referenced by the user. For example, the provisioned instance may be launched using a machine image that includes a container management system. In various embodiments, the instance may be launched before the job is scheduled or in response to the scheduling of the job. After launch, a container may be filled with the program instructions indicated by the user for performing the job. In one embodiment, jobs may also represent programs (and potentially input data) submitted to a program execution service that manages its own fleet of compute instances. In one embodiment, output 117 associated with the jobs 116 may be returned to the client 110A.

The execution of the scheduled jobs may represent concurrent execution of multiple jobs, often using multiple compute instances or other computing resources operating in parallel. The execution (including attempted but failed execution) of the scheduled jobs may be monitored, e.g., for success or failure. The execution may be monitored using any suitable techniques or components, including instrumentation of the compute instances with agent software, the use of an external metric collection service, and/or analysis of exit codes emitted by the programs that run the jobs.

A component such as the resource manager 180 may monitor existing instances for their health and for their availability to perform new jobs. Particular jobs may be assigned to particular compute instances based (at least in part) on the health and/or availability of particular compute instances. If the environment 195A is constrained to particular sources for computing resources, such as a spot market or on-demand market, then the instance may be provisioned from one of those sources. In one embodiment, a compute instance that is already running in the managed compute environment 195A and that may have executed a previous job may be selected for a new job in the queue(s) 152; such an instance may be potentially reconfigured for execution of a new job, e.g., by replacing the contents of a container with new program instructions associated with the new job. In one embodiment, a job may be assigned to a scheduled reserved compute instance if the job is expected to complete within the window of time associated with that instance; otherwise the job may be held in a queue or assigned to another compute instance. Compute instances may be provisioned and/or added to the managed compute environment 195A automatically (e.g., without direct input from a user) and programmatically (e.g., by execution of program instructions) by the compute environment management system 100.

If the managed compute environment 195A has a constraint for the minimum number of virtual CPUs or compute instances, then at least that number of virtual CPUs or compute instances may be provisioned, launched, configured, and left running in the environment such that the instances are either executing jobs or ready to be assigned jobs. If the managed compute environment 195A has a constraint for the maximum number of virtual CPUs or compute instances, then no more than that number of virtual CPUs or compute instances may be running in the environment at any given time. Similarly, if the managed compute environment 195A has a constraint for the maximum aggregate budget for computing resources (e.g., over a particular time period such as per hour, per day, or per month), then no more resources may be provisioned or further used (if the resource has a continuing cost) once the budget is reached. If a maximum number of compute instances or a maximum aggregate budget has been reached when a job is ready in the queue(s), then the job may be left in the queue until the compute environment management system 100 is permitted by the constraint(s) 131 to provision another instance or when an existing instance is available to be reused.

In one embodiment, the compute instance may be automatically deprovisioned and/or returned to the pool of available computing resources upon completion (e.g., successful or unsuccessful termination) of the job or otherwise when the system 100 determines that the instance is no longer needed in the managed compute environment. Deprovisioning may include terminating and returning the compute instance to the pool of available resources of a provider network, e.g., as managed by the resource manager 180. Deprovisioned instances may be used in the future by the same client or by one or more different clients. In one embodiment, compute instances may be deprovisioned and/or removed automatically (e.g., without direct input from a user) and programmatically (e.g., by execution of program instructions) by the compute environment management system 100. In this manner, computing resources in a compute environment 195A may be provisioned and deprovisioned according to user-defined constraints and then used efficiently with automatic and programmatic management.

Figure 3:
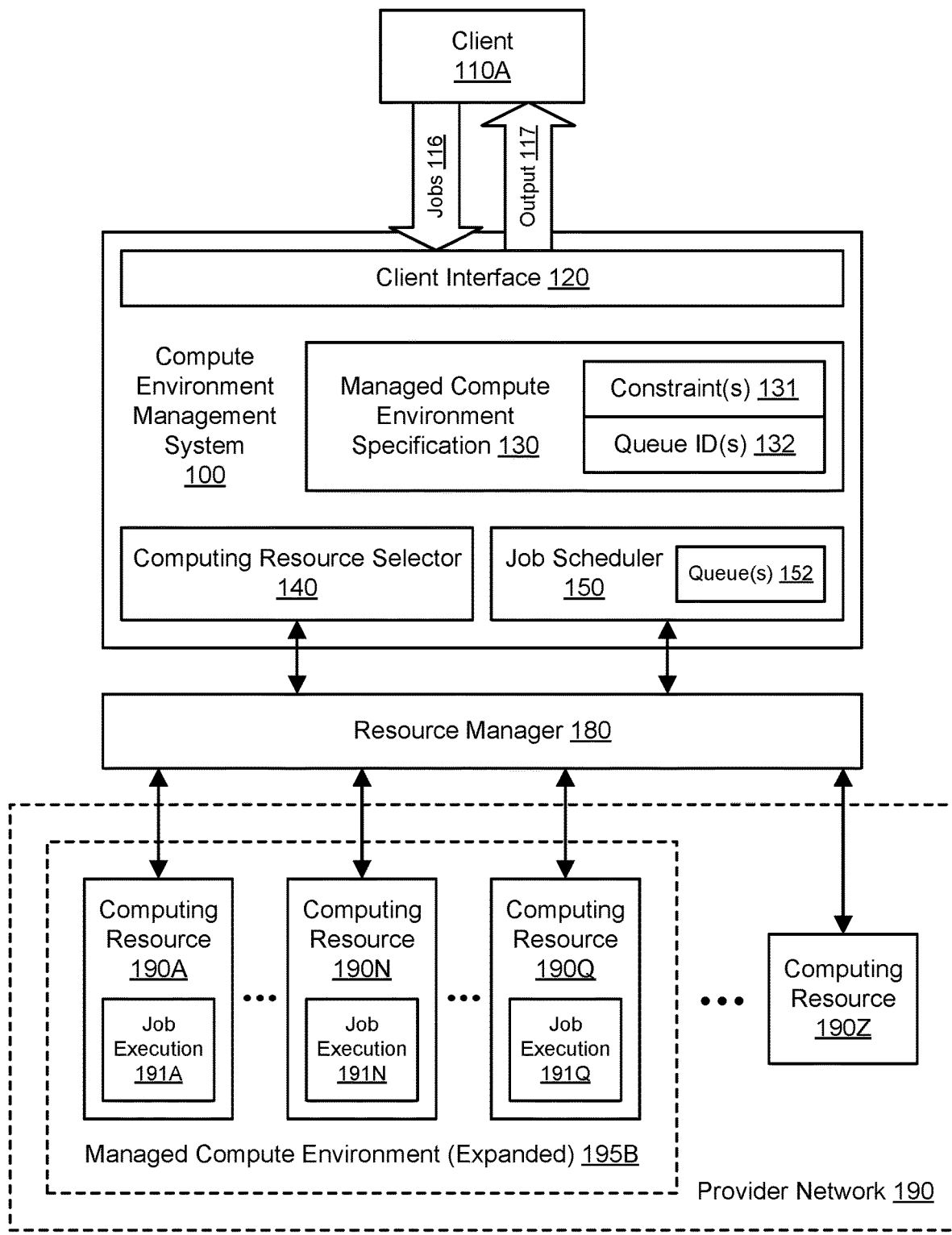
FIG. 3 illustrates further aspects of the example system environment for job execution with managed compute environments, including automatic expansion of computing resources in a managed computing environment using resources of a provider network, according to one embodiment.

FIG. 3 illustrates further aspects of the example system environment for job execution with managed compute environments, including automatic expansion of computing resources in a managed computing environment using resources of a provider network, according to one embodiment. Within the environmental constraints 131, the set of computing resources for a managed compute environment 195A may be automatically increased in number or otherwise changed in composition based on automated analysis of the job queue(s) and/or computing resource usage by the compute environment management system 100. For example, additional resources may be added to a managed compute environment if the queue(s) are determined to hold too many jobs at a particular time. As another example, additional resources may be added to a managed compute environment if overutilization of the existing computing resources is determined (e.g., based on usage metrics). As shown in the example of FIG. 3, the managed compute environment 195B has been expanded from the environment shown in FIG. 2 to include additional computing resources, including resource 190Q. Computing resource 190Q has been configured for job execution 191Q and may be assigned jobs from the job queue(s) 152.

Figure 4:
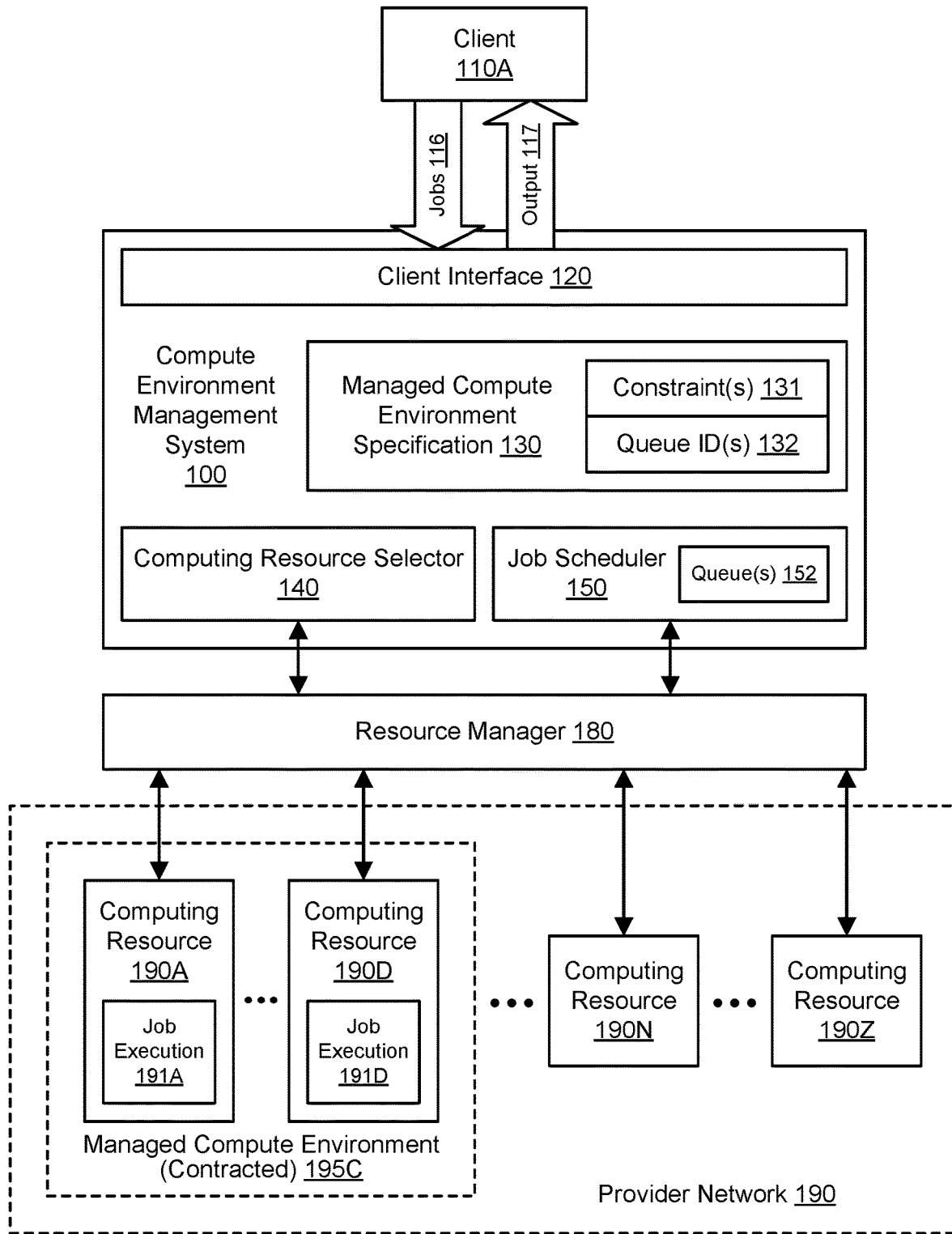
FIG. 4 illustrates further aspects of the example system environment for job execution with managed compute environments, including automatic contraction of computing resources in a managed computing environment, according to one embodiment.

FIG. 4 illustrates further aspects of the example system environment for job execution with managed compute environments, including automatic contraction of computing resources in a managed computing environment, according to one embodiment. Within the environmental constraints 131, the set of computing resources for a managed compute environment 195A may be automatically decreased in number or otherwise changed in composition based on automated analysis of the job queue(s) and/or computing resource usage by the compute environment management system 100. For example, existing resources may be removed from a managed compute environment if the queue(s) are determined to be empty too often. As another example, existing resources may be removed from a managed compute environment if underutilization of the existing computing resources is determined (e.g., based on usage metrics). As shown in the example of FIG. 4, the managed compute environment 195C has been contracted from the environment shown in FIG. 2 or FIG. 3, such that one or more resources including resource 190N have been removed from the environment and returned to the pool of available resources of the provider network 190. Following the contraction, computing resources 190A through 190D are left in the managed compute environment 195C. Like resource 190A, computing resource 190D has been configured for job execution 191D and may be assigned jobs from the job queue(s) 152.

Figure 5:
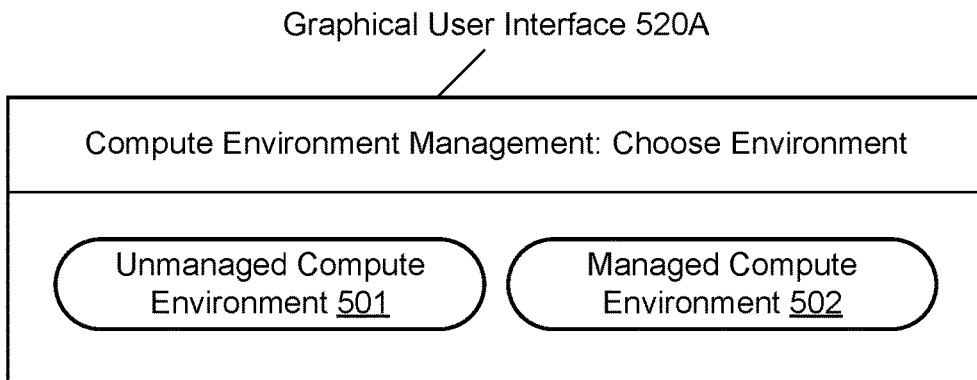
FIG. 5 illustrates an example of a graphical user interface for choosing a type of environment for a managed compute environment system, according to one embodiment.

FIG. 5 illustrates an example of a graphical user interface for choosing a type of environment for a managed compute environment system, according to one embodiment. The provider network 190 may offer multiple types of compute environments to clients, such as unmanaged or static compute environments and managed or dynamic compute environments. Unmanaged compute environments may include computing resources (such as compute instances) in a provider network or on client premises that are manually selected and provisioned by clients. The resources within unmanaged environments may often be used inefficiently, such that some compute instances may be left idle at times. By contrast, managed compute environments may include computing resources (such as compute instances) that are automatically selected and provisioned by the compute environment management system based (at least in part) on environmental constraints and on job availability. The compute environment management system 100 may automatically manage the type and number of computing resources within a managed compute environment.

The compute environment management system 100 may permit a user to opt for a managed compute environment over an unmanaged compute environment. To select the managed compute environment option, the user may interact with one or more interfaces of the compute environment management system 100, such as an application programming interface (API), command-line interface (CLI), and/or graphical user interface (GUI). Using the client interface 120, the compute environment management system 100 may present a graphical user interface (GUI) 520A for choosing an environment for compute environment management. The GUI 520A may include any suitable interface elements, such as an interface element 501 (e.g., a button) for selecting an unmanaged compute environment and an interface element 502 (e.g., a button) for selecting a managed compute environment. Suitable user input to the GUI 520A may select either the unmanaged option 501 or the managed option 502. For example, the user may operate a browser program on a client computing device that presents the GUI 520A; the browser may then interact with the compute environment management system via an API to implement the selection of the managed option.

Figure 6:
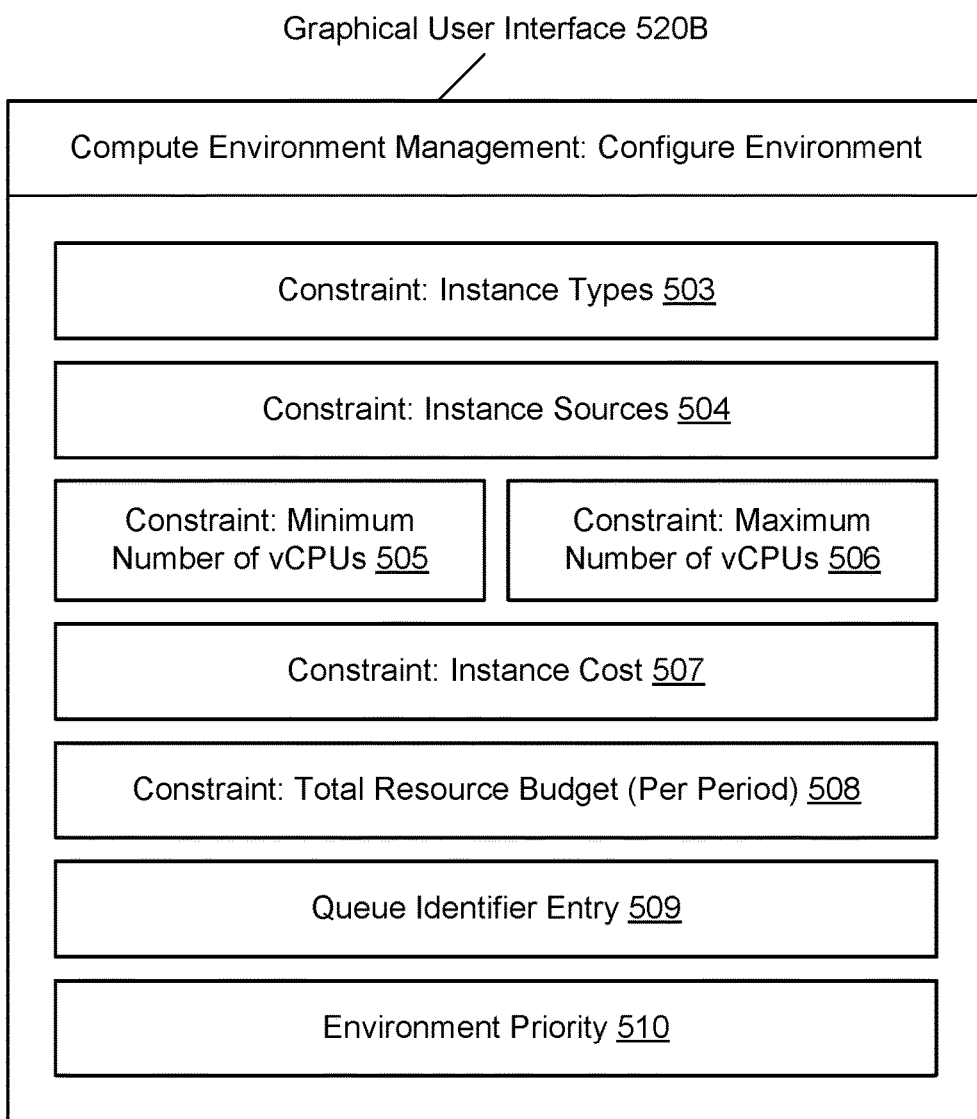
FIG. 6 illustrates an example of a graphical user interface for configuring a managed compute environment, according to one embodiment.

FIG. 6 illustrates an examples of a graphical user interface for configuring a managed compute environment, according to one embodiment. The compute environment management system 100 may permit a user to submit configuration options for a managed compute environment. To configure a managed compute environment, the user may interact with one or more interfaces of the compute environment management system 100, such as an application programming interface (API), command-line interface (CLI), and/or graphical user interface (GUI). Using the client interface 120, the compute environment management system 100 may present a graphical user interface (GUI) 520B for configuring a managed compute environment. The GUI 520B may include any suitable interface elements for environmental configuration. For example, the GUI 520B may include an interface element 503 for selecting or specifying one or more constraints for compute instance types and/or an interface element 504 for selecting or specifying one or more constraints for compute instance sources (e.g., a spot market, an on-demand market, scheduled reserved instances, and so on). As another example, the GUI 520B may include an interface element 505 for selecting or specifying one or more constraints for a minimum number of virtual CPUs (or compute instances) and an interface element 506 for selecting or specifying one or more constraints for a maximum number of virtual CPUs (or compute instances). The GUI 520B may include an interface element 507 for selecting or specifying one or more constraints for a cost per instance. The GUI 520B may include an interface element 508 for selecting or specifying one or more constraints for a total resource budget for the managed compute environment for a particular period of time. Additionally, the GUI 520B may include an interface element 509 for selecting or specifying identifiers of one or more job queues to be mapped to the managed compute environment. In one embodiment, the GUI 520B may include an interface element 510 for specifying a priority of the environment with respect to one or more queues, where multiple environments can be mapped to the same queue but with different relative priorities. Suitable user input to the GUI 520B may select or specify constraints and/or queue identifiers. For example, the user may operate a browser program on a client computing device that presents the GUI 520B; the browser may then interact with the compute environment management system via an API to implement the configuration of the managed compute environment.

Figure 7:
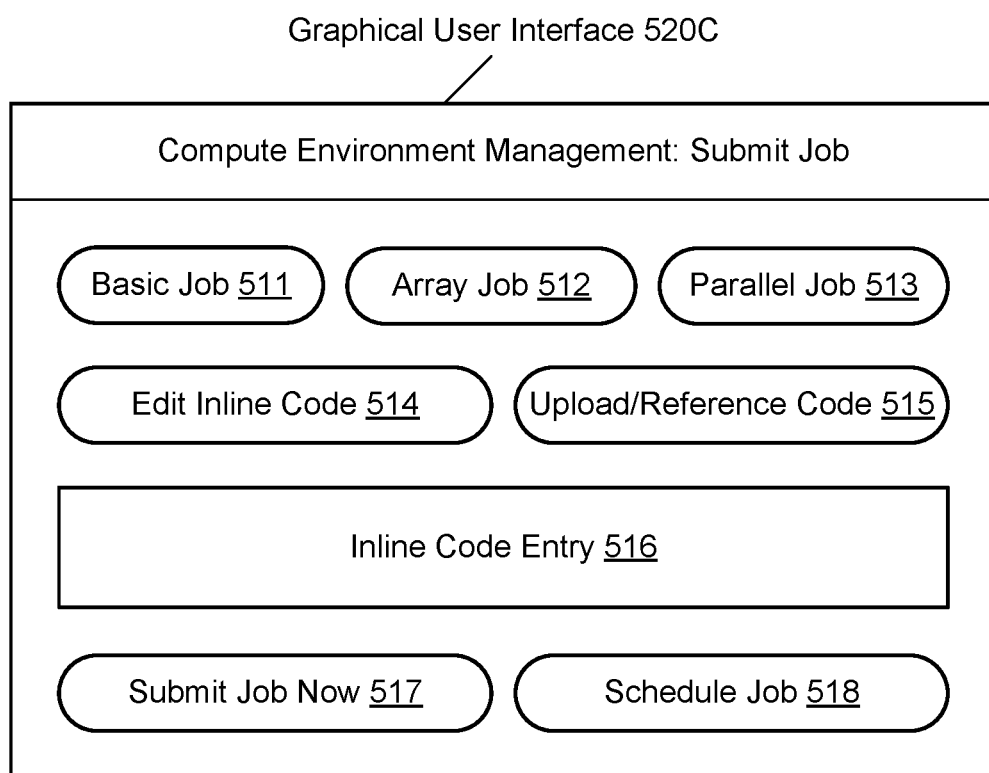
FIG. 7 illustrates an example of a graphical user interface for submitting a job to a managed compute environment, according to one embodiment.

FIG. 7 illustrates an examples of a graphical user interface for submitting a job to a managed compute environment, according to one embodiment. The compute environment management system 100 may permit a user to submit jobs to be executed in a managed compute environment. To submit a job to a compute environment, the user may interact with one or more interfaces of the compute environment management system 100, such as an application programming interface (API), command-line interface (CLI), and/or graphical user interface (GUI). Using the client interface 120, the compute environment management system 100 may present a graphical user interface (GUI) 520C for submitting jobs to a managed compute environment. The GUI 520C may include any suitable interface elements for choosing job types, specifying or referencing job code, and/or scheduling jobs.

The compute environment management system 100 may support different types of jobs such as basic jobs, array jobs, and parallel jobs. A basic job may represent a command or shell script that will be executed once or retried until it is considered to have failed. An array job may represent a job that shares common parameters, such as virtual compute instances and memory, and that runs as a collection of related but separate basic jobs, potentially in parallel across multiple hosts. Examples of typical array jobs may include Monte Carlo simulations, parametric sweeps, and large rendering jobs. A parallel job may represent a parallel, tightly coupled workload, potentially using many compute instances running concurrently. Jobs may also be submitted as parts of workflows, such that some jobs may be scheduled only if their dependencies are met. In one embodiment, the GUI 520C may include an interface element 511 (e.g., a button) for choosing a basic job, an interface element 512 (e.g., a button) for choosing an array job, and/or an interface element 513 (e.g., a button) for choosing a parallel job.

The GUI 520C may include an interface element 514 (e.g., a button) for choosing to edit or enter inline program code for a job, along with an interface element 516 (e.g., a text entry box) for entry of inline program code, and/or an interface element 515 (e.g., a button) to upload or provide a reference to program code for a job. Additionally, the GUI 520C may include an interface element 517 (e.g., a button) to submit the job for execution without delay and/or an interface element 518 (e.g., a button) to schedule the job for execution at a later point in time. In one embodiment, the GUI 520C may also permit the selection of a particular queue (e.g., based on its queue identifier) for the job. Suitable user input to the GUI 520C may be used to submit jobs. For example, the user may operate a browser program on a client computing device that presents the GUI 520C; the browser may then interact with the compute environment management system via an API to implement the submission of the job to the managed compute environment.

In one embodiment, a graphical user interface associated with the compute environment management system 100 may provide (e.g., to a user) analysis or results of the automated resource management. For example, a management console may present information about the cost of the managed compute environment over a particular period of time. The cost information may be presented in the aggregate and/or broken down by resource type, queue ID, and/or job type. As another example, a management console may present information about usage analysis, such as job throughput, in the managed compute environment. The usage information may be presented in the aggregate and/or broken down by resource type, queue ID, and/or job type. The management console may be implemented in the client interface 120.

Figure 8A:
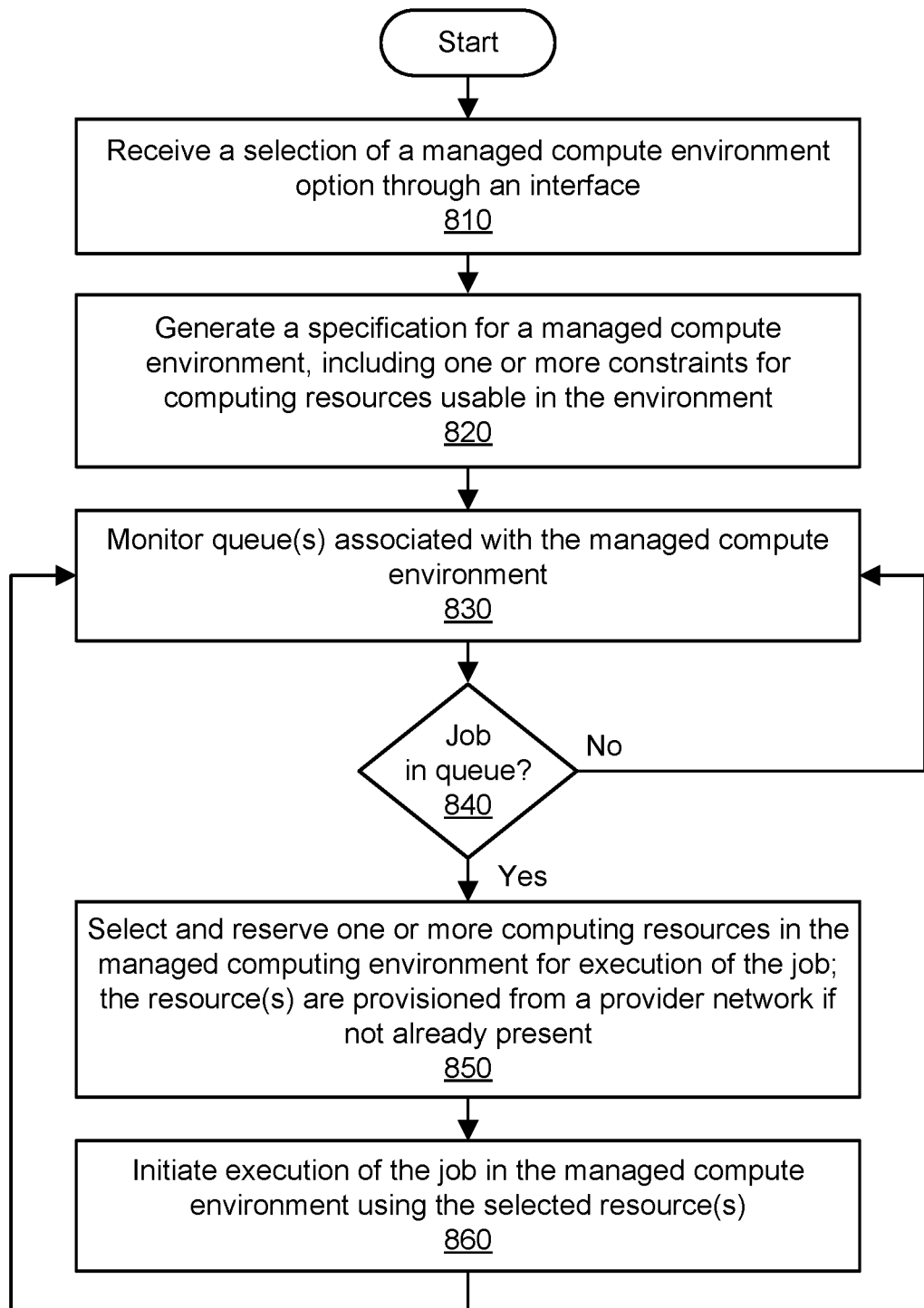
FIG. 8A is a flowchart illustrating a method for job execution with managed compute environments, according to one embodiment.

FIG. 8A is a flowchart illustrating a method for job execution with managed compute environments, according to one embodiment. A provider network may offer multiple types of compute environments to clients, such as unmanaged or static compute environments and managed or dynamic compute environments. Unmanaged compute environments may include computing resources (such as compute instances) in a provider network or on client premises that are manually selected and provisioned by clients. The resources within unmanaged environments may often be used inefficiently, such that some compute instances may be left idle at times. By contrast, managed compute environments may include computing resources (such as compute instances) that are automatically selected and provisioned by the compute environment management system based (at least in part) on environmental constraints and on job availability. A compute environment management system may automatically manage the type and number of computing resources within a managed compute environment. The compute environment management system may permit a user to opt for a managed compute environment over an unmanaged compute environment. As shown in 810, a selection of a managed compute environment option may be received from a compute environment management system, e.g., by a client of the system.

Managed compute environments may be offered by a provider network that includes various types of computing resources, including different types of compute instances that may vary in capability, configuration, cost, availability, and so on. The provider network may offer resources to multiple clients (or tenants) concurrently and may be termed a multi-tenant provider network. To configure a managed compute environment, a user may access the provider network with a user account that is associated with an account name or other user identifier. The user may belong to an organization (e.g., a business entity) that is a client or customer of the provider network, e.g., with an arrangement in place to pay fees for use of resources in the provider network, including resources in a managed compute environment. The user account may be controlled by an individual user or by multiple users within an organization. To select the managed compute environment option, the user may interact with one or more interfaces of the compute environment management system, such as an application programming interface (API), command-line interface (CLI), and/or graphical user interface (GUI). For example, the user may operate a browser program on a client computing device that presents a GUI for selecting a managed option; the browser may then interact with the compute environment management system via an API to implement the selection of the managed option.

As shown in 820, a specification may be generated for the managed compute environment. In generating a specification of the managed compute environment, one or more constraints for the environment may be received from the user, approved by the user, and/or defined based (at least in part) on default policies. The constraints may be associated with computing resources, including compute instances, and may be defined or approved by a user. For example, the managed compute environment may be associated with a constraint specifying one or more compute instance types that are recommended for and/or usable within the environment. As another example, the managed compute environment may be associated with a constraint specifying a minimum number of virtual CPUs or compute instances and/or a constraint specifying a maximum number of virtual CPUs or compute instances. As a further example, the managed compute environment may be associated with a constraint specifying the source of compute instances, e.g., a spot market for instances that are less expensive but without guaranteed availability, an on-demand market for instances that are more expensive but with guaranteed availability, scheduled reserved instances for a window of time, and so on. The managed compute environment may be associated with cost-related constraints such as a constraint specifying a maximum cost per compute instance (e.g., a maximum bid for the spot market as a percentage of on-demand pricing) and/or a constraint specifying a maximum aggregate budget for compute instances. In some embodiments, the managed compute environment may be associated with a constraint specifying other types of resources such as storage resources and/or other suitable constraints.

To define the specification for the managed compute environment, the user may interact with one or more interfaces of the compute environment management system, such as an application programming interface (API), command-line interface (CLI), and/or graphical user interface (GUI). For example, the user may operate a browser program on a client computing device that presents a GUI for specifying constraints; the browser may then interact with the compute environment management system via an API to implement the selection of the constraints.

The managed compute environment may also be associated with one or more job queues configured to hold data indicative of jobs for attempted execution within the environment. The data indicative of a job as stored in a job queue may include a job definition or other data and/or metadata associated with a job. Although the example of one or more queues is discussed herein, it is contemplated that other types of data structures (e.g., workflows) may also be used to hold jobs for attempted execution within the managed compute environment. In some embodiments, the other data structures may be used to feed job queues, e.g., such that a job in a workflow is placed in a job queue when the job's dependencies are satisfied. Particular queue(s) may be associated with the environment based on user input. The mapping of the queue(s) to the managed compute environment may be generated or approved by a user and submitted to a compute environment management system within the provider network. To map the queue(s) to the managed compute environment, the user may interact with one or more interfaces of the compute environment management system (or other component of the provider network), such as an application programming interface (API), command-line interface (CLI), and/or graphical user interface (GUI). For example, the user may operate a browser program on a client computing device that presents a GUI for associating queues with managed compute environments; the browser may then interact with the compute environment management system of the provider network via an API to implement the association.

In one embodiment, multiple queues may be associated with different priority levels relative to one another. For example, a first queue may be configured to hold higher-priority jobs, while a second queue may be configured to hold lower-priority jobs that are offered to instances in the compute environment when the first queue is empty. The priorities may be defined or approved by the user with any suitable interface to the compute environment management system. In one embodiment, a queue may be mapped to more than one compute environment, and the compute environments may have different priorities relative to the queue. For example, a higher-priority queue may be mapped to a first compute environment (managed) and also to a second compute environment (managed or unmanaged). Jobs from the higher-priority queue may first be offered to the first compute environment; the jobs may be assigned to the other "overflow" compute environment only when the first compute environment lacks sufficient capacity to execute the jobs, e.g., due to a maximum number of instances or a maximum aggregate budget being met.

As shown in 830, the queue(s) may be monitored. The compute environment management system may monitor the queue(s) and dynamically manage the computing resources in the managed compute environment based (at least in part) on the contents of the queue(s). Monitoring of the queue(s) may be initiated at any suitable point in time, such as when the specification for the managed compute environment is submitted by the user or when a user-defined starting time associated with the environment is reached. As shown in 840, it may be determined whether or not the queue(s) hold one or more jobs suitable for attempted execution within the managed compute environment. If not, then the monitoring may continue as shown in 830.

If the queue(s) do hold any suitable jobs, then as shown in 850, for a particular job in the queue(s), the system may automatically select and reserve one or more computing resources such as a compute instance from a pool of available computing resources of a provider network. A compute instance may be selected for the job based (at least in part) on any requirements associated with the job and/or on the constraint(s) for the managed compute environment. For example, if the environment is constrained to a particular set of compute instance types, then the compute environment management system may provision a compute instance of one of those types. In one embodiment, jobs may be associated with job definitions that indicate requirements or recommendations for computing resources (e.g., processor requirements, storage requirements, memory requirements, network requirements, and so on) and/or the anticipated duration of job execution. The compute instance type may be selected from among the permissible or recommended types based (at least in part) on the job definition, e.g., based on usage requirements specified for the job. In this manner, different types of jobs with different requirements may be assigned by the compute environment management system to different types of compute instances in the managed compute environment.

A component of the provider network such as a resource manager may monitor existing instances for their health and for their availability to perform new jobs. Particular jobs may be assigned to particular compute instances based (at least in part) on the health and/or availability of particular compute instances. If the environment is constrained to particular sources for computing resources, such as a spot market or on-demand market, then the instance may be provisioned from one of those sources. In one embodiment, the operation shown in 850 may include selecting and reserving a compute instance that is already running in the managed compute environment and that may have executed a previous job; such an instance may be potentially reconfigured for execution of a new job, e.g., by replacing the contents of a container with new program instructions associated with the new job. In one embodiment, a job may be assigned to a scheduled reserved compute instance if the job is expected to complete within the window of time associated with that instance; otherwise the job may be held in a queue or assigned to another compute instance. Any suitable component(s) of the provider network may be used to select an instance for execution of a particular job, including a job scheduler. Compute instances may be provisioned and/or added to the managed compute environment automatically (e.g., without direct input from a user) and programmatically (e.g., by execution of program instructions) by the compute environment management system.

If the managed compute environment has a constraint for the minimum number of virtual CPUs or compute instances, then at least that number of compute instances may be provisioned, launched, configured, and left running in the environment such that the instances are either executing jobs or ready to be assigned jobs. In one embodiment, the operation shown in 850 may include selecting and reserving one of these compute instances that are already running in the managed compute environment. If the managed compute environment has a constraint for the maximum number of virtual CPUs or compute instances, then no more than that number of compute instances may be running in the environment at any given time. Similarly, if the managed compute environment has a constraint for the maximum aggregate budget for computing resources (e.g., over a particular time period such as per hour, per day, or per month), then no more resources may be provisioned or further used (if the resource has a continuing cost) once the budget is reached. If a maximum number of compute instances or a maximum aggregate budget has been reached when a job is ready in the queue(s), then the job may be left in the queue until the compute environment management system is permitted by the constraints to provision another instance or when an existing instance is available to be reused.

As shown in 860, execution of the job may be initiated using the compute instance and optionally any other suitable computing resources (e.g., storage resources, additional compute instances, and so on). Any suitable component(s) of the provider network may be used to initiate execution of a job on an instance, including a resource manager that configures computing resources (including compute instances) for execution of jobs. The compute instances may implement a container management system such that client-provided program code may be executed within a container on an instance in order to perform a job. In one embodiment, a compute instance may be launched with an empty container, and the container may be filled with a program associated with a job when the job is assigned to the instance.

In one embodiment, the compute instance may be automatically deprovisioned and/or returned to the pool of available computing resources upon completion (e.g., successful or unsuccessful termination) of the job. Deprovisioning may include terminating and returning the compute instance to the pool of available resources of a provider network, e.g., as managed by a resource manager. Deprovisioned instances may be used in the future by the same client or by one or more different clients. In one embodiment, compute instances may be deprovisioned and/or removed automatically (e.g., without direct input from a user) and programmatically (e.g., by execution of program instructions) by the compute environment management system. In this manner, computing resources in a compute environment may be provisioned and deprovisioned according to user-defined constraints and then used efficiently with automatic and programmatic management.

Figure 8B:
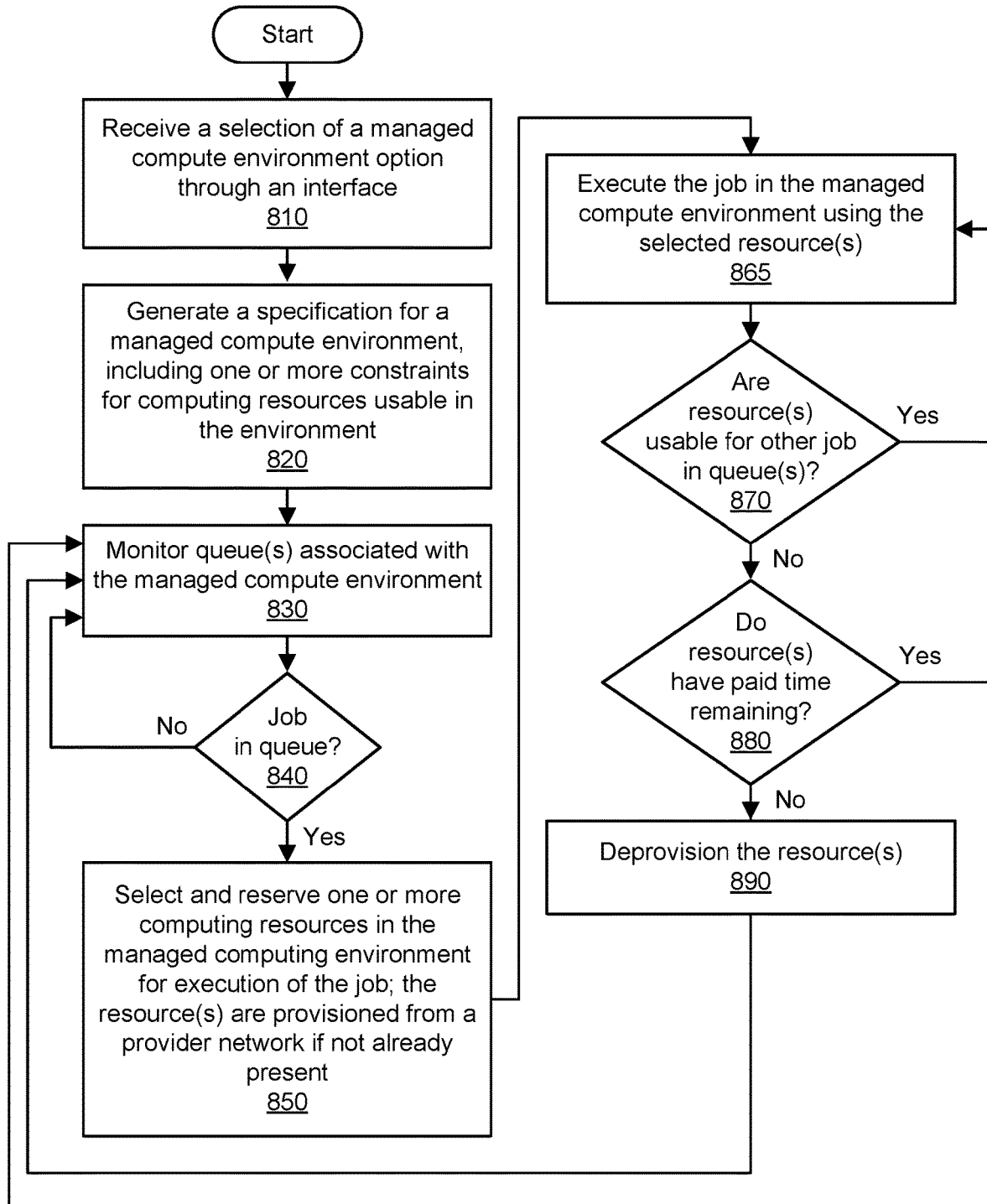
FIG. 8B is a flowchart illustrating a method for job execution with managed compute environments, including reuse of existing compute instances, according to one embodiment.

FIG. 8B is a flowchart illustrating a method for job execution with managed compute environments, including reuse of existing compute instances, according to one embodiment. In one embodiment, the same instance may be used for one or more jobs (potentially using the container management system discussed above) and then deprovisioned when the queue(s) associated with the managed compute environment are empty. The operations shown in 810, 820, 830, 840, and 850 may be performed as discussed above. As shown in 865, execution of the job may be initiated as discussed above using the compute instance and optionally any other suitable computing resources (e.g., storage resources, additional compute instances, and so on). Execution of the job may terminate successfully or unsuccessfully. As shown in 870, it may be determined whether or not the queue(s) hold one or more jobs suitable for attempted execution using the compute instance. If so, then the instance may be left running, and the method may return to the operation shown in 860 for execution of another job using the compute instance. If not, then as shown in 880, it may be determined whether the resource(s) have additional paid time remaining, e.g., if the resource(s) are billed on an hourly basis and part of an hour remains. If so, then the instance may be left running, and the method may return to the operation shown in 830 for monitoring of the queue(s). If not, then as shown in 890, the compute instance may be automatically deprovisioned and/or returned to the pool of available computing resources upon completion (e.g., successful or unsuccessful termination) of the job. Deprovisioning may include terminating and returning the compute instance to the pool of available resources of a provider network, e.g., as managed by a resource manager. Deprovisioned instances may be used in the future by the same client or by one or more different clients. In one embodiment, compute instances may be deprovisioned and/or removed automatically (e.g., without direct input from a user) and programmatically (e.g., by execution of program instructions) by the compute environment management system.

Job Execution with Scheduled Reserved Compute Instances

Figure 9:
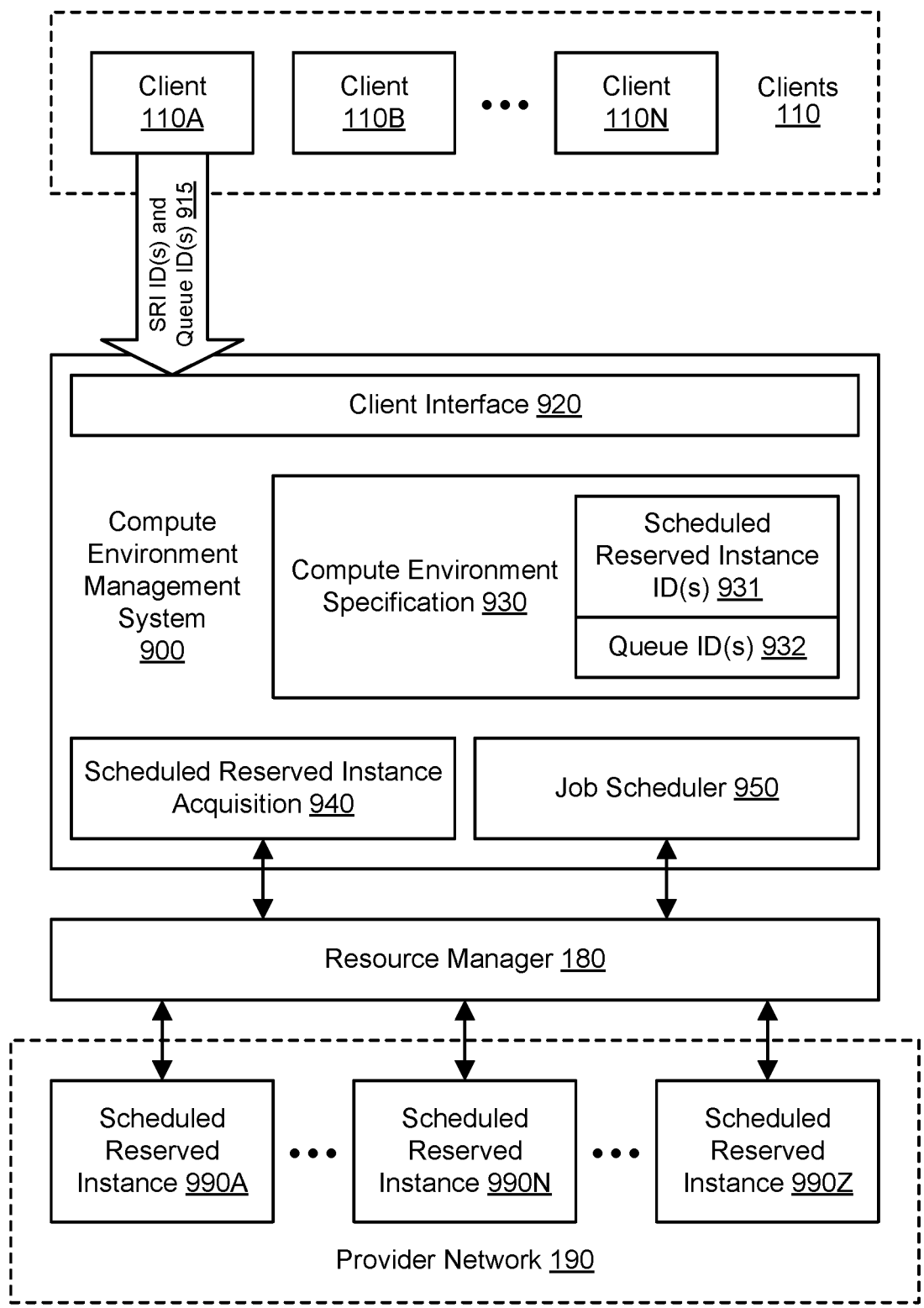
FIG. 9 illustrates an example system environment for job execution with scheduled reserved compute instances, according to one embodiment.

FIG. 9 illustrates an example system environment for job execution with scheduled reserved compute instances, according to one embodiment. A compute environment management system 900 may manage various compute environments on behalf of clients. The compute environment management system 900 may automatically manage the provisioning and deprovisioning of scheduled reserved compute instances on behalf of clients, e.g., such that scheduled reserved instances are automatically added to or removed from particular compute environments at appropriate times. Scheduled reserved instances may include computing resources (e.g., compute instances) that are accessible by or on behalf of a client for a particular period of time, e.g., based on a reservation. In one embodiment, the computing resources associated with such a reservation may be exclusively used by a particular client and not by other clients during the period of time. The compute environment management system 900 may automatically manage job queues associated with scheduled reserved compute instances and their compute environments, e.g., such that clients may add jobs to the queues before and/or during the windows of time associated with the scheduled reserved instances. Aspects of the compute environment management system 900 may be combined with aspects of the compute environment management system 100, e.g., to use scheduled reserved instances in managed compute environments.

Although scheduled reserved compute instances are discussed herein for purposes of example, it is contemplated that the compute environment management system 900 may be used for automated management of computing resources other than compute instances during windows of time associated with those resources. Scheduled reserved compute instances (also referred to herein as scheduled reserved instances, reserved instances, or SRIs) may be offered by a provider network 190 that includes various types of computing resources, including different types of compute instances that may vary in capability, configuration, cost, availability, and so on. The provider network 190 may offer resources to multiple clients (or tenants) concurrently and may be termed a multi-tenant provider network. A user may access the provider network with a user account that is associated with an account name or other user identifier. The user may belong to an organization (e.g., a business entity) that is a client or customer of the provider network, e.g., with an arrangement in place to pay fees for use of resources in the provider network 190, including the scheduled reserved compute instances. The user account may be controlled by an individual user or by multiple users within an organization.

To select and reserve the scheduled reserved compute instances, a user may interact with one or more client interfaces of the provider network 190, such as an application programming interface (API), command-line interface (CLI), and/or graphical user interface (GUI). For example, the user may operate a browser program on a client computing device that presents a GUI for selecting and reserving scheduled reserved compute instances; the browser may then interact with a resource manager 180 associated with the provider network 190 via an API to implement the scheduling and reservation. The user may first discover compute instances that are available for scheduling and reservation within a desired window of time and may then enter into an agreement with the provider network 190 to purchase a particular quantity of those compute instances for that window of time. The scheduled reserved compute instances may be of one or more particular instance types having particular processor resources, memory resources, storage resources, network resources, and so on. The window of time may be a one-time window (e.g., 5 PM to 10 PM on a particular day) or a recurring window (e.g., 5 PM to 10 PM on weekdays for one year). By entering into the agreement, the user may be guaranteed to have exclusive access (relative to other clients of the provider network) to the scheduled reserved compute instances for the window of time. The agreement may result in a reservation identifier that can be used to reference the set of scheduled reserved compute instances.

The compute environment management system 900 may include a client interface 920 that permits interaction with the clients 110A-110N, e.g., such that a client can submit information to associate scheduled reserved instances with particular compute environments. Using the client interface 920, the compute environment management system 900 may receive input 915 from a particular client 110A. The input 915 may represent user input and/or input generated programmatically. The input 915 may specify or reference identifiers for one or more scheduled reserved compute instances (e.g., by a reservation identifier for the instance(s)) and/or one or more queue identifiers. In one embodiment, the input 915 may also include other attributes of a compute environment, such as an identifier of the environment, a type of the environment (e.g., managed or unmanaged), a priority of the environment, and/or other suitable attributes. Based (at least in part) on the input 915, the compute environment management system 900 may generate a compute environment specification 930 for a compute environment associated with the client 110A. The compute environment specification 930 may include the one or more SRI identifiers 931 indicated by the client 110A and also the queue identifier(s) 932. The compute environment specification 930 may include or implement a mapping of one or more queues to a particular compute environment by storing an association between those queue(s) (e.g., the queue ID(s) 932) and the compute environment.

The compute environment specification 930 may also include additional metadata or configuration data usable for managing a set of computing resources. The additional metadata or configuration data may represent other properties or attributes of the compute environment or its constituent resources. For example, the compute environment specification 930 may associate particular labels (including alphanumeric labels) with particular resources for ease of resource management. As another example, the compute environment specification 930 may include data associating a compute environment with a virtual private cloud (VPC) representing a virtual network, e.g., within the provider network 190. The VPC may be isolated from other resources and VPCs within the provider network 190 and may have its own range of IP addresses referred to as a subnet; resources in the compute environment may be launched into the subnet.

In one embodiment, the client 110A may also configure an auto-launch functionality for the scheduled reserved compute instances using the client interface 920. The auto-launch configuration may also be included in the compute environment specification 930. The scheduled reserved compute instances for a particular compute environment may have the same window of time. However, it is also contemplated that different scheduled reserved compute instances within a compute environment may be reserved for different windows of time. In one embodiment, the compute environment may include other kinds of resources in addition to the scheduled reserved compute instances, such as storage resources and/or compute instances purchased in an on-demand or spot market offered by the provider network 190.

The compute environment management system 900 may include a scheduled reserved instance acquisition component 940. Using the scheduled reserved instance acquisition component 940, the compute environment management system 900 may acquire (by interacting with the resource manager 180) one or more of the scheduled reserved instances 990A-990N of a provider network 190 for a particular compute environment associated with a particular client. The scheduled reserved instance acquisition component 940 may automatically add scheduled reserved instances to a compute environment at appropriate times, e.g., based (at least in part) on the opening of the window of time associated with the instances. The scheduled reserved instance acquisition component 940 or another component, such as the resource manager 180, may automatically remove scheduled reserved instances from the compute environment at appropriate times, e.g., based (at least in part) on the closing of the window of time associated with the instances.

The compute environment management system 900 may also include a job scheduler component 950. Using the job scheduler 950, the compute environment management system 900 may receive jobs from a client (e.g., the same client 110A that configured the compute environment with the scheduled reserved instance(s)) and cause those jobs to be executed using the computing resources in the compute environment, potentially including the scheduled reserved instances. The job scheduler 950 may implement the one or more queues associated with the queue identifier(s) 932. The job scheduler 950 may determine a time at which to initiate execution of a particular job within a compute environment associated with the client that provided the job. In one embodiment, the job scheduler 950 may determine one or more particular computing resources, such as one or more scheduled reserved compute instances, with which to initiate execution of a particular job.

As discussed above, each of the client devices 110A-110N may be implemented using one or more computing devices, any of which may be implemented by the example computing device 3000 illustrated in FIG. 12. The clients 110A-110N may be coupled to the compute environment management system 900 via one or more networks, potentially including the Internet. Client devices 110A-110N may communicate with the compute environment management system 900 as discussed above with respect to the compute environment management system 100. Although three clients 110A, 110B, and 110N are shown for purposes of illustration and example, it is contemplated that any suitable number and configuration of client devices may be used to provide configuration information and jobs to the compute environment management system 900 and provider network 190.

The provider network 190 may include a plurality of computing resources such as SRIs 990A through 990N through 990Z. The resources may include compute instances, storage instances, and so on. The resources offered by the compute environment 190 may vary in type, configuration, availability, cost, and other characteristics. For example, the provider network may include a set of compute instances (physical compute instances and/or virtual compute instances) of different compute instance types, where the compute instance types may vary in the capabilities and features of their processor resources, memory resources, storage resources, network resources, and so on, and potentially in their cost as well. When not in use by clients, the SRIs 990A-990Z may belong to a pool of available computing resources. The resource manager 180 may provision individual ones of the SRIs 990A-990Z for individual clients when reservations permit. The resource manager 180 may also terminate and/or deprovision individual ones of the SRIs 990A-990Z and return them to the pool of available resources of the provider network 190, e.g., when the reservation period has ended. Although three scheduled reserved instances 990A, 990N, and 990Z are shown for purposes of illustration and example, it is contemplated that any suitable number and configuration of scheduled reserved instances may be used to execute jobs in a compute environment managed by the compute environment management system 900. It is contemplated that the provider network 190 may include additional components not shown, fewer components than shown, or different combinations, configurations, or quantities of the components shown.

The compute environment management system 900 may include a plurality of computing devices, any of which may be implemented by the example computing device 3000 illustrated in FIG. 12. In various embodiments, portions of the described functionality of the compute environment management system 900 may be provided by the same computing device or by any suitable number of different computing devices. If any of the components of the compute environment management system 900 are implemented using different computing devices, then the components and their respective computing devices may be communicatively coupled, e.g., via a network. Each of the illustrated components may represent any combination of software and hardware usable to perform their respective functions. It is contemplated that the compute environment management system 900 may include additional components not shown, fewer components than shown, or different combinations, configurations, or quantities of the components shown.

Figure 10:
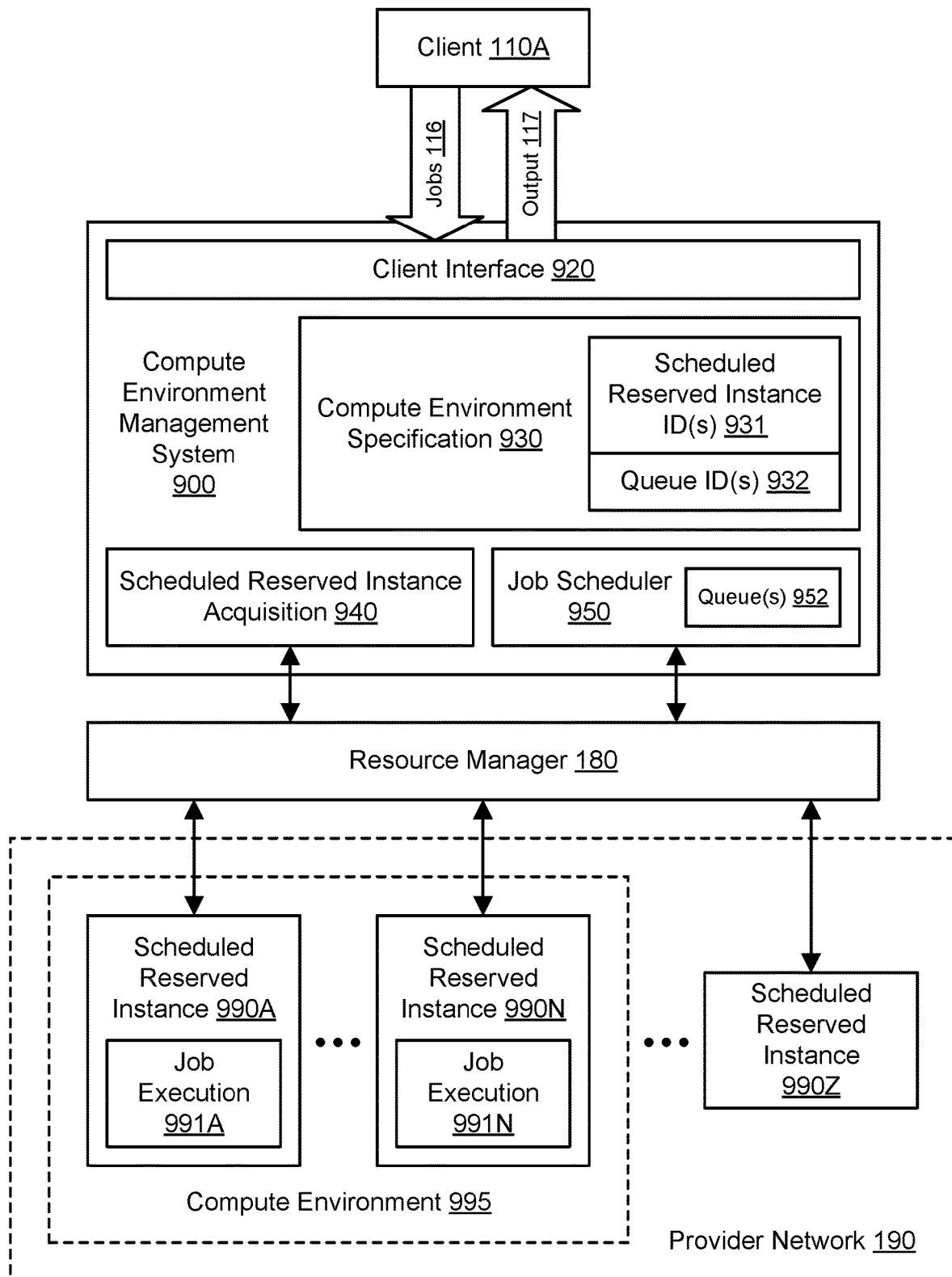
FIG. 10 illustrates further aspects of the example system environment for job execution with scheduled reserved compute instances, including the use of scheduled reserved instances for job execution during a window of time, according to one embodiment.

FIG. 10 illustrates further aspects of the example system environment for job execution with scheduled reserved compute instances, including the use of scheduled reserved instances for job execution during a window of time, according to one embodiment. The compute environment management system 900 may manage a compute environment 995 associated (e.g., defined at least in part by) with the compute environment specification 930. During the window of time for the scheduled reserved instance ID(s) 931 (or shortly before the opening of the window), the SRI acquisition component 940 may automatically add the SRIs associated with the ID(s) to the compute environment. As shown in the example of FIG. 10, the scheduled reserved instances 990A through 990N may be added to the compute environment 995 such that they are present during at least a portion of the window of time associated with their reservation. In one embodiment, to implement an auto-launch policy, the SRI acquisition component 940 may automatically add the SRIs 990A-990N to the compute environment 995 based (at least in part) on their window of time opening, e.g., at or shortly before the beginning of their reserved time. In one embodiment, the SRI acquisition component 940 may automatically remove the SRIs 990A-990N from the compute environment 995 based (at least in part) on their window of time closing.

SRIs 990A-990N may be automatically provisioned, added, and/or launched when their window of time opens (e.g., at or shortly before the window of time opens), potentially even if no jobs are available in the relevant queues. In one embodiment, SRIs 990A-990N may be automatically provisioned, added, and/or launched during their window of time when jobs become available in the relevant queues. In one embodiment, some of the SRIs 990A-990N may be automatically provisioned, added, and/or launched when the window opens, and others of the SRIs 990A-990N may be automatically provisioned, added, and/or launched at a later point in time during the window. In one embodiment, a user may select not to have an auto-launch policy in place for SRIs 990A-990N, and those instances may be manually provisioned, added, and/or launched by a user during their window of time. In one embodiment, SRIs 990A-990N may be left running in the compute environment until their window of time closes, even if no jobs are available in the relevant queues.

Using the job scheduler 950, the compute environment management system 900 may receive jobs 116 from the client 110A and cause those jobs to be executed using computing resources in the compute environment 995. The compute environment 995 may be associated with the one or more job queues 952 configured to hold data indicative of the jobs 116 for attempted execution within the environment. The data indicative of the jobs 116 may include job definitions or other references to jobs and their data and metadata. Although the example of one or more queues is discussed herein, it is contemplated that other types of data structures (e.g., workflows) may also be used to hold jobs for attempted execution within the compute environment 995. In some embodiments, the other data structures may be used to feed job queues, e.g., such that a job in a workflow is placed in a job queue when the job's dependencies are satisfied. The job scheduler 950 may implement or link to the one or more job queues 952 associated with the queue identifier(s) 932.

In one embodiment, multiple queues 952 may be associated with different priority levels relative to one another. For example, a first queue may be configured to hold higher-priority jobs, while a second queue may be configured to hold lower-priority jobs that are offered to instances in the compute environment when the first queue is empty. The priorities may be defined or approved by the user with the client interface 920 to the compute environment management system 900. In one embodiment, a queue may be mapped to more than one compute environment, and the compute environments may have different priorities relative to the queue. For example, a higher-priority queue may be mapped to the compute environment with the scheduled reserved compute instances and also to another compute environment with compute instances purchased in an on-demand or spot market offered by the multi-tenant provider network. Jobs from the higher-priority queue may first be offered to the compute environment with the scheduled reserved compute instances; the jobs may be assigned to the other "overflow" compute environment only when the compute environment with the scheduled reserved compute instances lacks sufficient capacity to execute the jobs.

In one embodiment, the mapping of one or more queues 952 to the compute environment 995 may be performed before the window of time opens for the scheduled reserved compute instances 990A-990N in the environment. However, it is also contemplated that one or more additional queues may be mapped to the compute environment 995, or the mapping of one or more of the existing queues may be removed, during the window of time. In one embodiment, one or more jobs may be added to at least one of the queues 952 before the window of time opens for the scheduled reserved compute instances. However, it is contemplated that the queue(s) 952 may be empty when the window of time opens. Jobs may also be added to the queue(s) during the window of time.

One or more workloads of jobs 116 may be received from a client device 110A operated by or associated with the user (potentially part of a client organization). The jobs may be received in one batch or in multiple batches over a period of time. The jobs 116 may be received by the compute environment management system 900 through any appropriate client interface 920, potentially including one or more application programming interface(s) (APIs), other programmatic interfaces, and/or user interfaces. The jobs 116 may be defined by one or more job definitions. A job definition may include or reference program instructions to be executed in processing the job. The job definition may include or be associated with a job identifier. A job definition may include or reference a set of input data to be processed using the program instructions. A job definition may also include or be provided with other suitable metadata, including timing information (e.g., a time to begin processing the workload, an anticipated time to run the workload, and/or a deadline), budgetary information, anticipated resource usage, and so on. A user of the client device 110A may access the compute environment management system 900 with a user account that is associated with an account name or other user identifier. The user may belong to an organization (e.g., a business entity) that is a client or customer of the compute environment management system 100, e.g., with an arrangement in place to pay fees for use of the compute environment management system and/or provider network 190. The user account may be controlled by an individual user or by multiple users within an organization.

The job scheduler 950 may determine a time at which to initiate execution of a particular job within the compute environment 995 associated with the client 110A that provided the job. In one embodiment, the job scheduler 950 may determine one or more particular computing resources with which to initiate execution of a particular job within the compute environment 995. As shown in the example of FIG. 10, the SRI 990A may be configured with a capability for job execution 991A. Similarly, the SRI 990N may be configured with a capability for job execution 991N.

Initiating the execution of a job may include the compute environment management system 900 interacting with a resource manager 180 to provision, reserve, configure, and/or launch one or more scheduled reserved compute instances to run the job. In a multi-tenant provider network, a compute instance may represent a virtual compute instance running on a physical compute instance, and the physical compute instance may be selected from a set of different instance types having different configurations or capabilities and potentially a different fee structure for usage. Each instance may be used for one or more jobs in a workload and then deprovisioned or reconfigured for use by the same user. In one embodiment, a container management system may be used with the virtual compute instances to deploy the program instructions supplied or otherwise referenced by the user. For example, the provisioned instance may be launched using a machine image that includes a container management system. In various embodiments, the instance may be launched before the job is scheduled or in response to the scheduling of the job. After launch, a container may be filled with the program instructions indicated by the user for performing the job. In one embodiment, jobs may also represent programs (and potentially input data) submitted to a program execution service that manages its own fleet of compute instances. In one embodiment, output 117 associated with the jobs 116 may be returned to the client 110A.

A scheduled reserved compute instance may be selected for a job based (at least in part) on any requirements associated with the job. In one embodiment, jobs may be associated with job definitions that indicate requirements or recommendations for computing resources (e.g., processor requirements, storage requirements, memory requirements, network requirements, and so on) and/or the anticipated duration of job execution. The compute instance may be selected from among the SRIs 990A-990N based (at least in part) on the job definition, e.g., based on usage requirements specified for the job. In this manner, different types of jobs with different requirements may be assigned by the compute environment management system 900 to different types of scheduled reserved compute instances in the managed compute environment 995.

The execution of the scheduled jobs using the SRIs 990A-990N may represent concurrent execution of multiple jobs, often using multiple compute instances or other computing resources operating in parallel. The execution (including attempted but failed execution) of the scheduled jobs may be monitored, e.g., for success or failure. The execution may be monitored using any suitable techniques or components, including instrumentation of the compute instances with agent software, the use of an external metric collection service, and/or analysis of exit codes emitted by the programs that run the jobs.

The scheduled reserved compute instances 990A-990N may be deprovisioned and removed from the compute environment 995 when the window of time closes. Deprovisioning may include terminating and returning the compute instances to the pool of available resources of a provider network 190, e.g., as managed by a resource manager 180. In one embodiment, the scheduled reserved compute instances 990A-990N may be automatically deprovisioned and removed from the environment 995 based (at least in part) on the window of time closing. Deprovisioned instances that are returned to a pool of available resources may be used in the future by the same client or by one or more different clients. In one embodiment, scheduled reserved compute instances may be deprovisioned and/or removed automatically (e.g., without direct input from a user) and programmatically (e.g., by execution of program instructions) by the compute environment management system 900, e.g., based (at least in part) on the reservation expiring at the close of the window. In one embodiment, scheduled reserved compute instances may be deprovisioned and/or removed automatically and programmatically before the closing of the window. For example, one or more SRIs may be terminated and removed from the compute environment 995 based (at least in part) on automated analysis of the queue(s) mapped to the environment, e.g., based on a determination that the throughput of jobs is not sufficient to make efficient use of one or more of the SRIs during the window. As another example, one or more SRIs may be terminated and removed from the compute environment 995 based (at least in part) on the client's account reaching a maximum number of concurrent instances across one or more compute environments.

The compute environment 995 may be part of a multi-tenant provider network 190 in which instances 990A-990N (e.g., compute instances, storage instances, and so on) may be provisioned from one or more pools of available resources. Alternatively, the provider network 190 may represent a client compute environment, e.g., a set of computing resources on premises managed by the client that submitted the jobs 116. A client compute environment may typically have more constrained resources than a multi-tenant provider network, and so the compute environment management system 900 as described herein may be especially useful for automatically managing resources on behalf of clients in a multi-tenant provider network.

Scheduled reserved compute instances may be particularly appropriate for jobs that are reoccurring or otherwise predictable in terms of timing. For example, a financial services client may need to calculate their positions at the same time every weekday. As another example, a bank may need to process loan applications during business hours. As yet another example, an animation studio may typically submit scenes to be rendered at particular times of day. Scheduled reserved compute instances may also be particularly appropriate for jobs that are not easily interruptible and thus less suited to the use of spot instances whose availability is not guaranteed.

By using a compute environment management system 900 for automated management of scheduled reserved compute instances, utilization of the instances may be optimized during their reserved windows of time. By using a compute environment management system 900 for automated management of scheduled reserved compute instances, instances may be used to run a diverse set of jobs associated with many workloads while appropriately prioritizing the jobs that motivated the purchase of the scheduled reserved compute instances. The use of the scheduled reserved compute instances and/or other types of compute instances may be monitored to understand the aggregate job execution history for a client. Based on analysis of the job execution history, recommendations about compute instance purchases (including scheduled reserved compute instances) from a multi-tenant provider network can be made to individual clients, e.g., for guaranteed capacity and/or cost optimization. For example, the compute environment management system 900 may recommend that a particular client shift jobs from on-demand instances (typically more expensive but with guaranteed availability) or spot instances (typically less expensive but without guaranteed availability) to scheduled reserved compute instances.

Figure 11A:
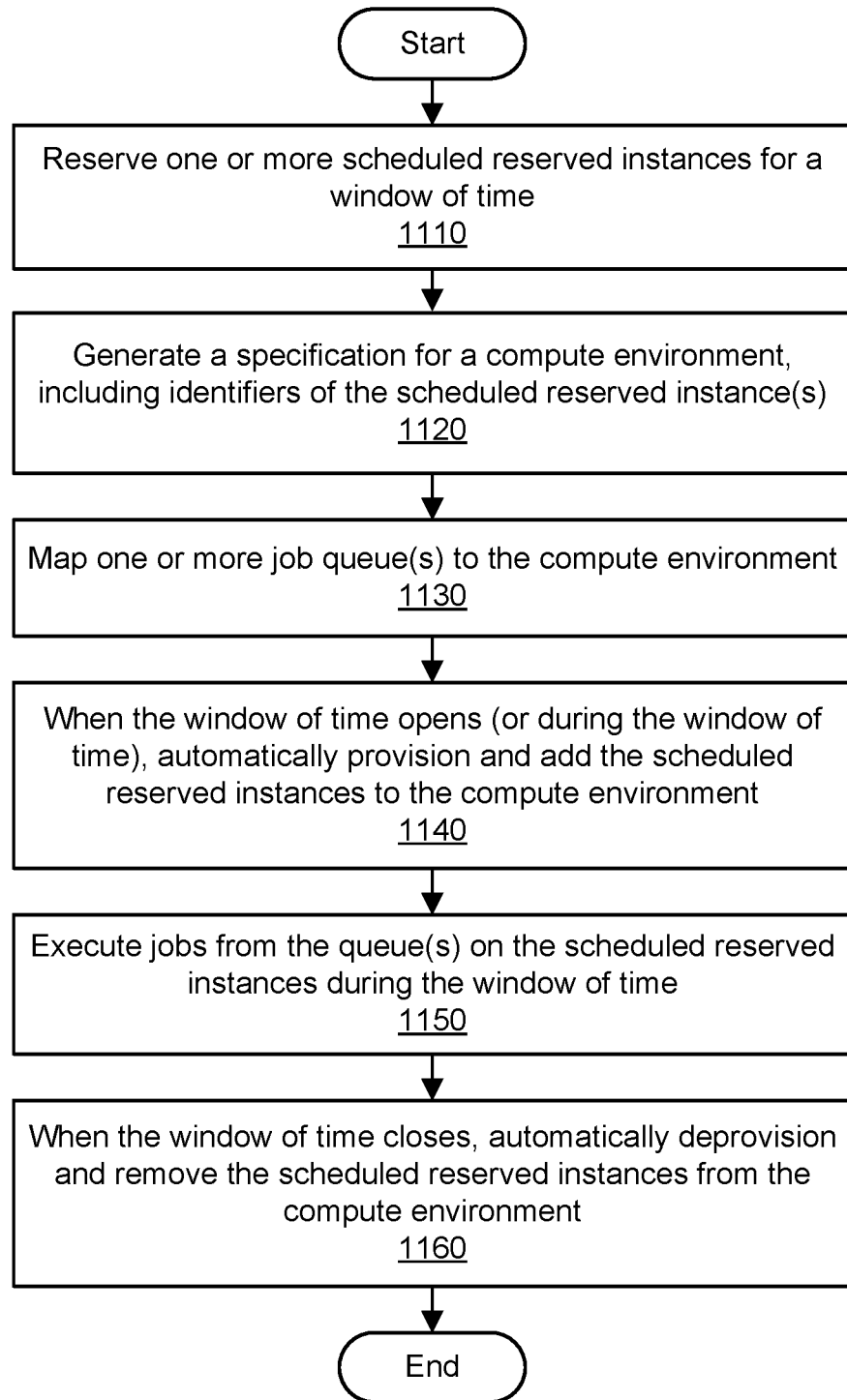
FIG. 11A is a flowchart illustrating a method for job execution with scheduled reserved compute instances, according to one embodiment.

FIG. 11A is a flowchart illustrating a method for job execution with scheduled reserved compute instances, according to one embodiment. As shown in 1110, one or more scheduled reserved compute instances may be reserved on behalf of a user. The scheduled reserved compute instances may be offered by a provider network that includes various types of computing resources, including different types of compute instances that may vary in capability, configuration, cost, availability, and so on. The provider network may offer resources to multiple clients (or tenants) concurrently and may be termed a multi-tenant provider network. The user may access the provider network with a user account that is associated with an account name or other user identifier. The user may belong to an organization (e.g., a business entity) that is a client or customer of the provider network, e.g., with an arrangement in place to pay fees for use of resources in the provider network, including the scheduled reserved compute instances. The user account may be controlled by an individual user or by multiple users within an organization.

To select and reserve the scheduled reserved compute instances, the user may interact with one or more interfaces of the provider network, such as an application programming interface (API), command-line interface (CLI), and/or graphical user interface (GUI). For example, the user may operate a browser program on a client computing device that presents a GUI for selecting and reserving scheduled reserved compute instances; the browser may then interact with a resource manager of the provider network via an API to implement the scheduling and reservation. The user may first discover compute instances that are available for scheduling and reservation within a desired window of time and may then enter into an agreement with the provider network to purchase a particular quantity of those compute instances for that window of time. The scheduled reserved compute instances may be of one or more particular instance types having particular processor resources, memory resources, storage resources, network resources, and so on. The window of time may be a one-time window (e.g., 5 PM to 10 PM on a particular day) or a recurring window (e.g., 5 PM to 10 PM on weekdays for one year). By entering into the agreement, the user may be guaranteed to have exclusive access (relative to other clients of the provider network) to the scheduled reserved compute instances for the window of time. The agreement may result in a reservation ID that can be used to reference the set of scheduled reserved compute instances.

As shown in 1120, a compute environment may be specified or defined such that the environment includes the scheduled reserved compute instances. The compute environment may exist within a multi-tenant provider network in which resources (e.g., compute instances, storage instances, and so on) may be provisioned from pools of available resources. Alternatively, the compute environment may represent a client compute environment, e.g., a set of computing resources on premises managed by a client organization associated with the user. The specification of the compute environment may be generated or approved by a user and submitted to a compute environment management system within a provider network. The compute environment may include a managed compute environment as discussed above, e.g., such that the compute environment has constraints relating to a type and/or number of compute instances that are usable within that environment.

To associate the scheduled reserved compute instances with the compute environment, the user may interact with one or more interfaces of the compute environment management system (or other component of the provider network), such as an application programming interface (API), command-line interface (CLI), and/or graphical user interface (GUI). For example, the user may operate a browser program on a client computing device that presents a GUI for associating scheduled reserved compute instances (based on one or more reservation IDs) with compute environments; the browser may then interact with the compute environment management system of the provider network via an API to implement the association. In one embodiment, the user may also configure an auto-launch functionality for the scheduled reserved compute instances using the interface(s). In the example of FIG. 11A, the scheduled reserved compute instances may have the same window of time; however, it is contemplated that different scheduled reserved compute instances within a compute environment may be reserved for different windows of time. In one embodiment, the compute environment may include other kinds of resources in addition to the scheduled reserved compute instances, such as storage resources and/or compute instances purchased in an on-demand or spot market offered by the multi-tenant provider network.

As shown in 1130, one or more job queues may be mapped to the compute environment. The mapping of the queue(s) to the compute environment may be generated or approved by a user and submitted to a compute environment management system within the provider network. To map the queue(s) to the compute environment, the user may interact with one or more interfaces of the compute environment management system (or other component of the provider network), such as an application programming interface (API), command-line interface (CLI), and/or graphical user interface (GUI). For example, the user may operate a browser program on a client computing device that presents a GUI for associating queues with compute environments; the browser may then interact with the compute environment management system of the provider network via an API to implement the association. The queue(s) may be configured to hold jobs that can be assigned to compute instances (potentially including scheduled reserved compute instances) for attempted execution.

In one embodiment, multiple queues may be associated with different priority levels relative to one another. For example, a first queue may be configured to hold higher-priority jobs, while a second queue may be configured to hold lower-priority jobs that are offered to instances in the compute environment when the first queue is empty. The priorities may be defined or approved by the user with any suitable interface to the compute environment management system. In one embodiment, a queue may be mapped to more than one compute environment, and the compute environments may have different priorities relative to the queue. For example, a higher-priority queue may be mapped to the compute environment with the scheduled reserved compute instances and also to another compute environment with compute instances purchased in an on-demand or spot market offered by the multi-tenant provider network. Jobs from the higher-priority queue may first be offered to the compute environment with the scheduled reserved compute instances; the jobs may be assigned to the other "overflow" compute environment only when the compute environment with the scheduled reserved compute instances lacks sufficient capacity to execute the jobs.

In one embodiment, the mapping operation shown in 1130 may be performed before the window of time opens for the scheduled reserved compute instances. However, it is contemplated that one or more additional queues may be mapped to the compute environment, or the mapping of one or more of the existing queues may be removed, during the window of time. In one embodiment, one or more jobs may be added to at least one of the queues before the window of time opens for the scheduled reserved compute instances. However, it is contemplated that the queue(s) may be empty when the window of time opens.

As shown in 1140, one or more of the scheduled reserved compute instances may be provisioned and added to the compute environment during the window of time. Provisioning may include reserving the compute instances from a pool of available resources of a provider network, e.g., as managed by a resource manager. In one embodiment, a user may select to have an auto-launch policy in place for scheduled reserved compute instances, such that the scheduled reserved compute instances may be provisioned, added, and/or launched on behalf of the user automatically (e.g., without direct input from a user) and programmatically (e.g., by execution of program instructions) by the compute environment management system. Scheduled reserved compute instances may be automatically provisioned, added, and/or launched when their window of time opens (e.g., at or shortly before the window of time opens), potentially even if no jobs are available in the relevant queues. In one embodiment, scheduled reserved compute instances may be automatically provisioned, added, and/or launched during their window of time when jobs become available in the relevant queues. In one embodiment, some scheduled reserved compute instances may be automatically provisioned, added, and/or launched when the window opens, and other scheduled reserved compute instances may be automatically provisioned, added, and/or launched at a later point in time during the window. In one embodiment, a user may select not to have an auto-launch policy in place for scheduled reserved compute instances, and those instances may be manually provisioned, added, and/or launched by a user during their window of time. In one embodiment, scheduled reserved compute instances may be left running in the compute environment until their window of time closes, even if no jobs are available in the relevant queues.

As shown in 1150, jobs may be executed on the scheduled reserved compute instances during the window of time. If one or more jobs are available in the queue(s) when the window of time opens for the scheduled reserved compute instances, then execution of those jobs may be initiated without delay when the window opens. Jobs may also be added to the queue(s) during the window of time and assigned to scheduled reserved compute instances for execution during the window of time. If multiple queues have different relative priorities, then jobs may be taken from a lower-priority queue when one or more higher-priority queues are empty.

Any suitable component(s) of the provider network may be used to initiate execution of a job on an instance, including a job scheduler that selects particular compute instances for particular jobs and/or a resource manager that configures computing resources (including compute instances) for execution of jobs. A component of the provider network such as the resource manager may monitor instances for their health and for their availability to perform new jobs. In one embodiment, jobs may be associated with job definitions that indicate requirements or recommendations for computing resources (e.g., processor requirements, storage requirements, memory requirements, network requirements, and so on) and/or the anticipated duration of job execution. Particular jobs may be assigned to particular compute instances (including scheduled reserved compute instances) based (at least in part) on the health and/or availability of particular compute instances and/or on job definitions. In one embodiment, a job may be assigned to a scheduled reserved compute instance if the job is expected to complete within the window of time associated with that instance; otherwise the job may be held in a queue or assigned to another compute instance. The scheduled reserved compute instances may implement a container management system such that client-provided program code may be executed within a container on an instance in order to perform a job. In one embodiment, a scheduled reserved compute instance may be launched with an empty container, and the container may be filled with a program associated with a job when the job is assigned to the instance.

As shown in 1160, the scheduled reserved compute instances may be deprovisioned and removed from the compute environment when the window of time closes. Deprovisioning may include terminating and returning the compute instances to the pool of available resources of a provider network, e.g., as managed by a resource manager. Deprovisioned instances may be used in the future by the same client or by one or more different clients. In one embodiment, scheduled reserved compute instances may be deprovisioned and/or removed automatically (e.g., without direct input from a user) and programmatically (e.g., by execution of program instructions) by the compute environment management system, e.g., based (at least in part) on the reservation expiring at the close of the window. In one embodiment, scheduled reserved compute instances may be deprovisioned and/or removed automatically and programmatically before the closing of the window. For example, one or more SRIs may be terminated and removed from the compute environment based (at least in part) on automated analysis of the queue(s) mapped to the environment, e.g., based on a determination that the throughput of jobs is not sufficient to make efficient use of one or more of the SRIs during the window. As another example, one or more SRIs may be terminated and removed from the compute environment based (at least in part) on the client's account reaching a maximum number of concurrent instances across one or more compute environments.

Figure 11B:
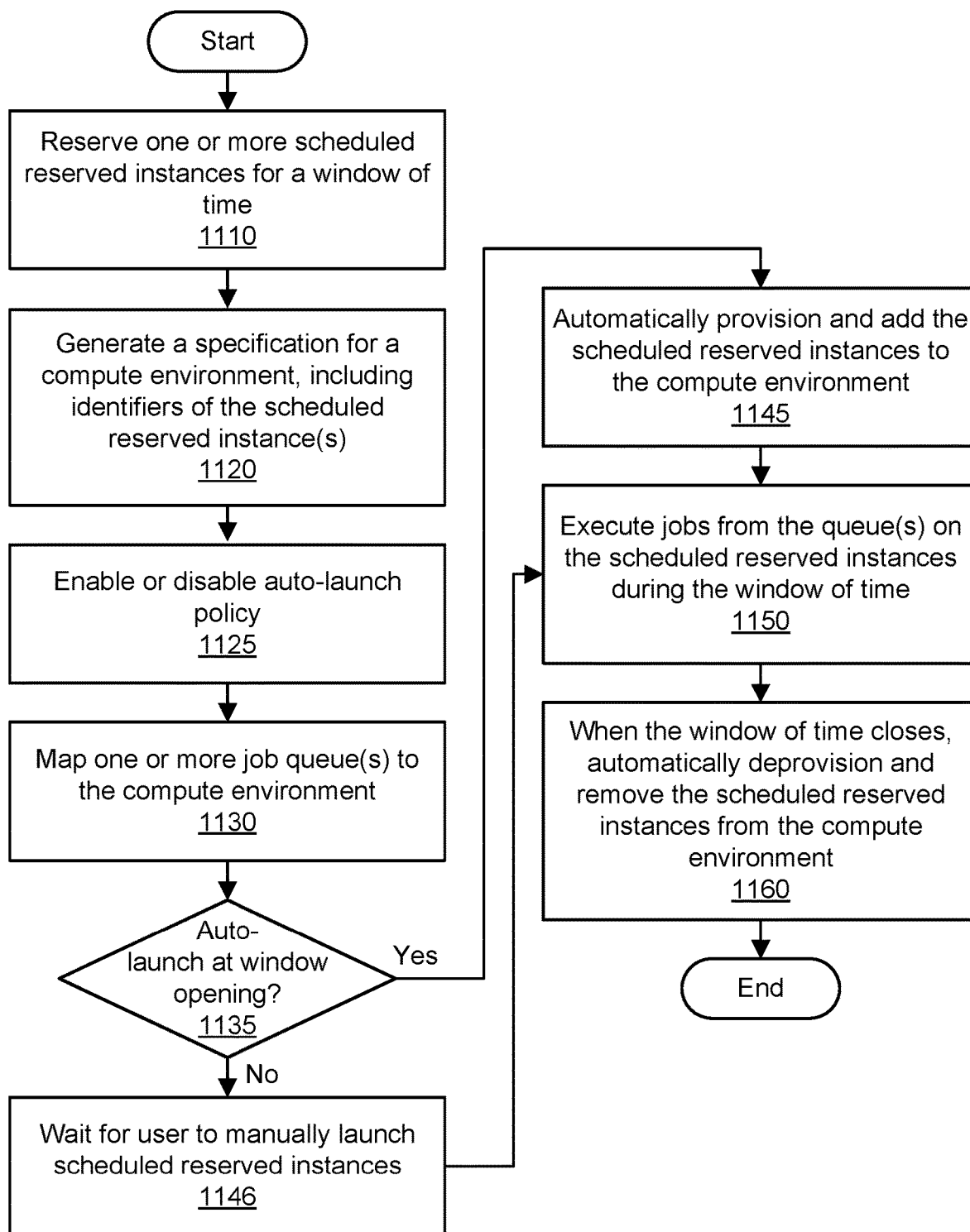
FIG. 11B is a flowchart illustrating a method for job execution with scheduled reserved compute instances, including auto-launch of scheduled reserved compute instances, according to one embodiment.

FIG. 11B is a flowchart illustrating a method for job execution with scheduled reserved compute instances, including auto-launch of scheduled reserved compute instances, according to one embodiment. As shown in 1110, one or more scheduled reserved compute instances may be reserved on behalf of a user. As shown in 1120, a compute environment may be specified or defined such that the environment includes the scheduled reserved compute instances.

As shown in 1125, an auto-launch policy may be enabled or disabled for the scheduled reserved compute instances in the compute environment. To enable or disable the auto-launch policy, the user may interact with one or more interfaces of the compute environment management system (or other component of the provider network), such as an application programming interface (API), command-line interface (CLI), and/or graphical user interface (GUI). For example, the user may operate a browser program on a client computing device that presents a GUI for selecting or declining an auto-launch policy for a compute environment; the browser may then interact with the compute environment management system of the provider network via an API to implement the user's choice. If selected, the auto-launch policy may represent a delegation of authority by the user to the compute environment management system to launch one or more scheduled reserved compute instances automatically and programmatically on behalf of the user. The auto-launch policy may typically represent a decision to launch a scheduled reserved compute instance when its window of time opens, but the auto-launch policy may instead indicate that a scheduled reserved compute instance should be launched during its window only when one or more jobs are available in one or more associated queues. In one embodiment, the auto-launch policy may be enabled by default. As shown in 1130, one or more job queues may be mapped to the compute environment.

As shown in 1135, when the window of time opens, it may be determined whether an auto-launch policy is in place for the scheduled reserved compute instances in the compute environment. If so, and optionally if any relevant conditions are met (e.g., jobs are available in one or more queues), then as shown in 1145, one or more of the scheduled reserved compute instances may be automatically provisioned and added to the compute environment. As discussed above, provisioning may include reserving the compute instances from a pool of available resources of a provider network, e.g., as managed by a resource manager. Based on the auto-launch policy, the scheduled reserved compute instances may be provisioned, added, and/or launched on behalf of the user automatically (e.g., without direct input from a user) and programmatically (e.g., by execution of program instructions) by the compute environment management system. Based on the auto-launch policy, scheduled reserved compute instances may be automatically provisioned, added, and/or launched when their window of time opens (e.g., at or shortly before the window of time opens), potentially even if no jobs are available in the relevant queues. In one embodiment, scheduled reserved compute instances may be automatically provisioned, added, and/or launched during their window of time when jobs become available in the relevant queues if so dictated by the auto-launch policy. In one embodiment, some scheduled reserved compute instances may be automatically provisioned, added, and/or launched when the window opens, and other scheduled reserved compute instances may be automatically provisioned, added, and/or launched at a later point in time during the window, again based on the auto-launch policy.

If an auto-launch policy is not in place for the scheduled reserved compute instances in the compute environment, then as shown in 1146, the method may wait for a user to manually launch the scheduled reserved compute instances. As shown in 1150, jobs may be executed on the scheduled reserved compute instances during the window of time. As shown in 1160, the scheduled reserved compute instances may be deprovisioned and removed from the compute environment at or before the closing of the window of time.

Figure 11C:
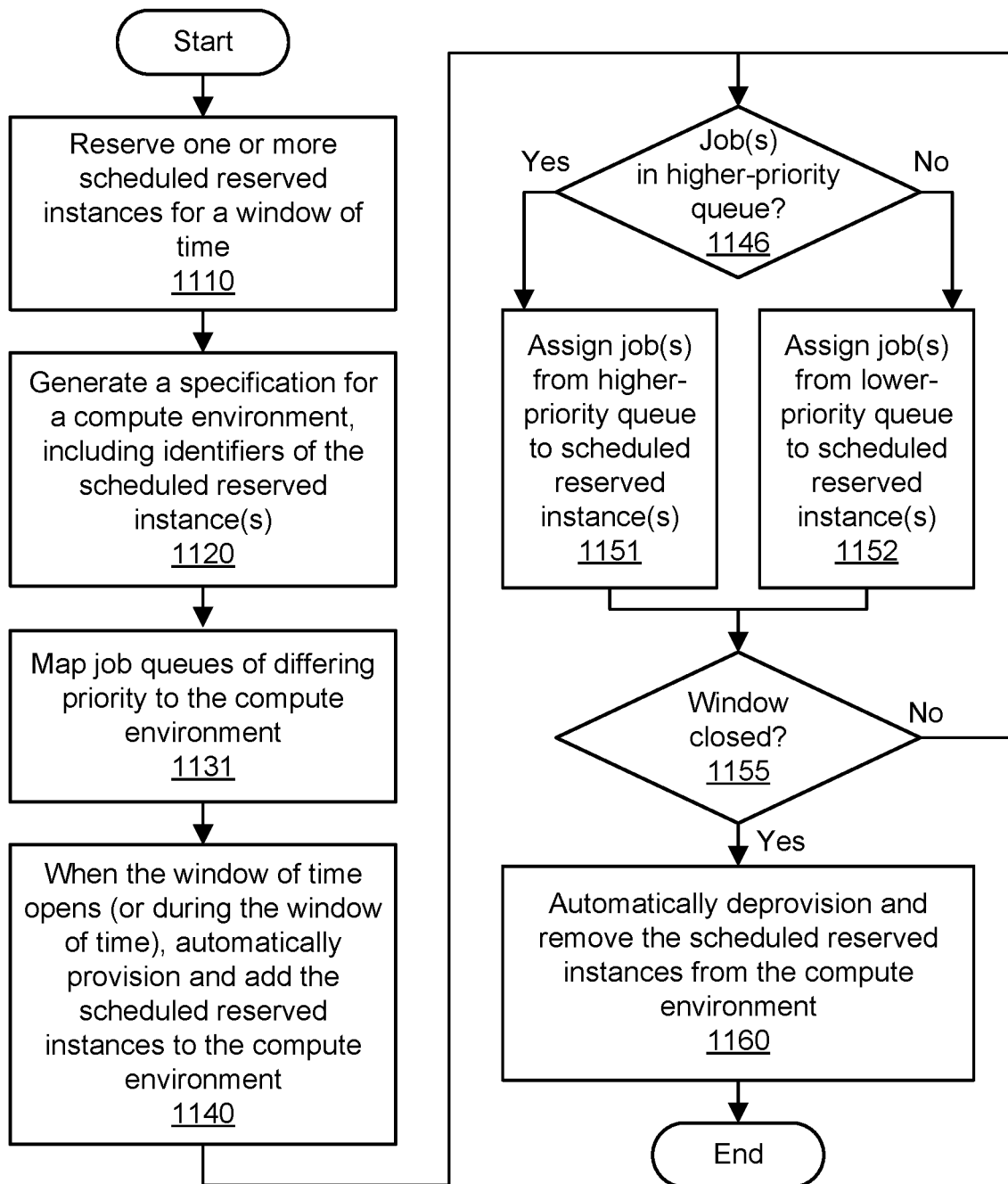
FIG. 11C is a flowchart illustrating a method for job execution with scheduled reserved compute instances, including the use of queues having differing priorities, according to one embodiment.

FIG. 11C is a flowchart illustrating a method for job execution with scheduled reserved compute instances, including the use of queues having differing priorities, according to one embodiment. As shown in 1110, one or more scheduled reserved compute instances may be reserved on behalf of a user. As shown in 1120, a compute environment may be specified or defined such that the environment includes the scheduled reserved compute instances.

As shown in 1131, a plurality of job queues of different relative priorities may be mapped to the compute environment. For example, a first queue may be configured to hold higher-priority jobs, while a second queue may be configured to hold lower-priority jobs that are offered to instances in the compute environment when the first queue is empty. The priorities may be defined or approved by the user with any suitable interface to the compute environment management system. In one embodiment, the mapping operation shown in 1131 may be performed before the window of time opens for the scheduled reserved compute instances. However, it is contemplated that one or more additional queues may be mapped to the compute environment, or the mapping of one or more of the existing queues may be removed, during the window of time. In one embodiment, one or more jobs may be added to at least one of the queues before the window of time opens for the scheduled reserved compute instances. However, it is contemplated that the queue(s) may be empty when the window of time opens. As shown in 1140, one or more of the scheduled reserved compute instances may be provisioned and added to the compute environment during the window of time, e.g., automatically when the window opens.

As shown in 1146, it may be determined whether the higher-priority queue contains one or more jobs. If so, then as shown in 1151, one or more jobs from the higher-priority queue may be assigned to the scheduled reserved compute instances for execution. If not, then as shown in 1152, one or more jobs from the lower-priority queue may be assigned to the scheduled reserved compute instances for execution. As shown in 1155, it may be determined whether the window of time has closed. If so, then as shown in 1160, the scheduled reserved compute instances may be automatically deprovisioned and removed from the compute environment. If the window is still open, then the method may return to the operation shown in 1146.

Figure 11D:
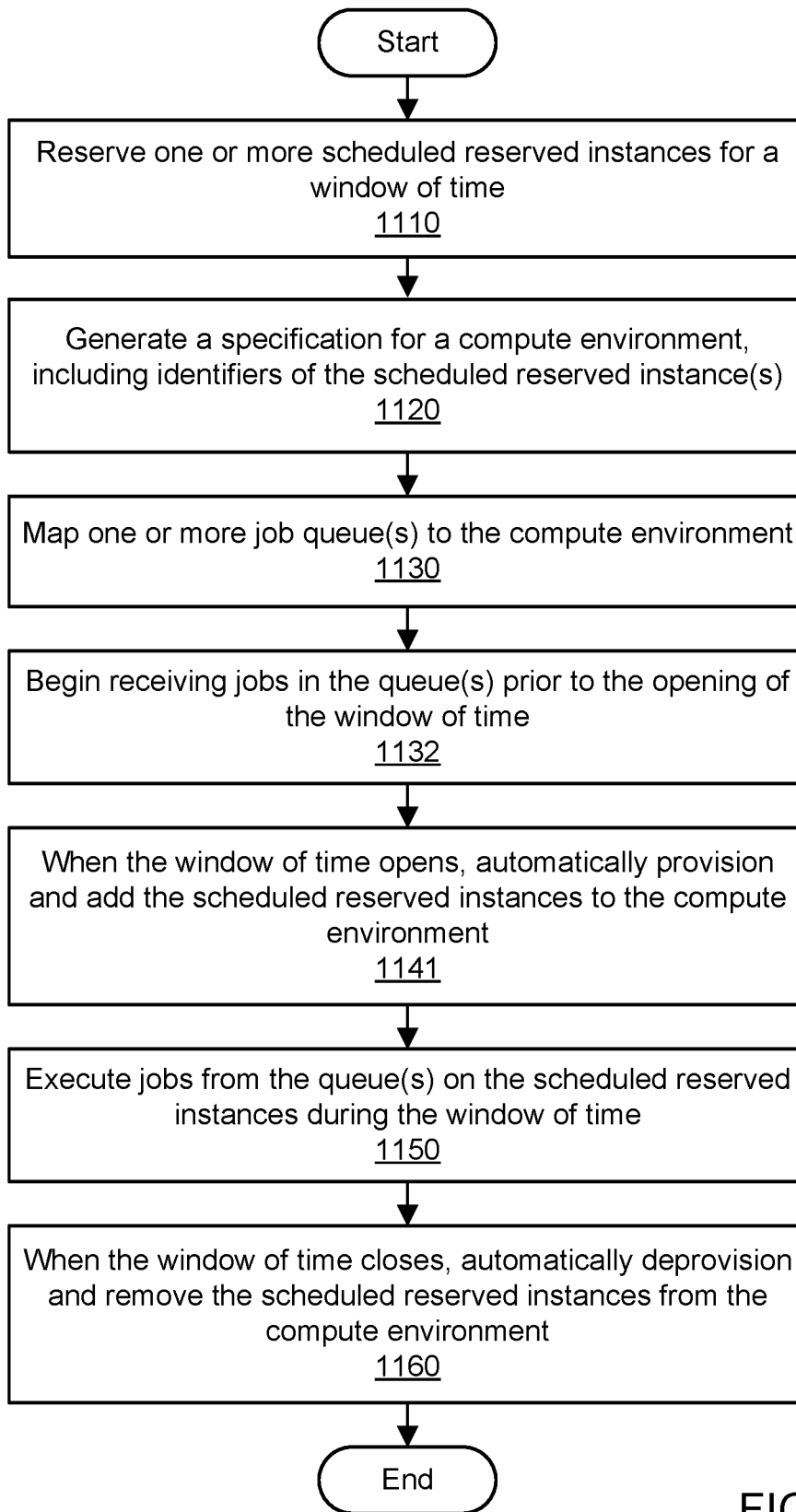
FIG. 11D is a flowchart illustrating a method for job execution with scheduled reserved compute instances, including the addition of one or more jobs to one or more queues prior to a window of time opening, according to one embodiment

FIG. 11D is a flowchart illustrating a method for job execution with scheduled reserved compute instances, including the addition of one or more jobs to one or more queues prior to a window of time opening, according to one embodiment. As discussed above, one or more scheduled reserved instances may be reserved for a window of time as shown in 1110, a specification may be generated for a compute environment that includes the scheduled reserved instances as shown in 1120, and one or more job queues may be mapped to the compute environment as shown in 1130. As shown in 1132, one or more jobs may be received in the queue(s) prior to the opening of the window of time. A job may be said to be added to a queue when data indicative of the job is added to the queue; the data indicative of the job may include a job definition or other job-related data and/or metadata. If the window of time is a recurring window (e.g., a particular window every weekday), then the operation shown in 1132 may represent receipt of jobs after the window closes but before the window reopens.

As shown in 1141, one or more of the scheduled reserved compute instances may be provisioned and added to the compute environment when the window opens. As shown in 1150, jobs may be executed on the scheduled reserved compute instances during the window of time, including the jobs that were added before the window opened. Additional jobs may be added to queue(s) during the window of time. As shown in 1160, the scheduled reserved compute instances may be deprovisioned and removed from the compute environment at or before the closing of the window of time.

Illustrative Computer System

In at least some embodiments, a computer system that implements a portion or all of one or more of the technologies described herein may include a computer system that includes or is configured to access one or more computer-readable media. FIG. 12 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of compute instances of a multi-tenant provider network;
one or more queues; and
one or more computing devices configured to implement a compute environment management system, wherein the compute environment management system is configured to:
generate a specification of a compute environment based at least in part on input from a client, wherein the input is usable to identify a plurality of reserved compute instances and identify the one or more queues, wherein the reserved compute instances are reserved for use in the compute environment by the client and disallowed for use by other clients for a window of time, wherein the specification comprises a mapping of the one or more queues to the compute environment, and wherein data indicative of one or more jobs is added to the one or more queues prior to adding the reserved compute instances to the compute environment;
responsive to the window of time opening and while the one or more jobs are pending in the one or more queues, provision the reserved compute instances from the plurality of compute instances of the multi-tenant provider network and add the reserved compute instances to the compute environment;
during the window of time, initiate execution of the one or more jobs from the one or more queues on at least one of the reserved compute instances in the compute environment; and
remove the reserved compute instances from the compute environment after the window of time closes.

2. The system as recited in claim 1, wherein the compute environment management system is further configured to:
based at least in part on analysis of the one or more queues, deprovision and remove at least one of the reserved compute instances from the compute environment prior to the window of time closing.

3. The system as recited in claim 1, wherein the queues comprise a higher priority queue and a lower priority queue, wherein one or more jobs in the lower priority queue are assigned to one or more of the reserved compute instances in the compute environment during the window of time and when the higher priority queue is empty.

4. The system as recited in claim 1, wherein the compute environment management system is further configured to:
during the window of time, initiate execution of one or more additional jobs from the one or more queues on the at least one of the reserved compute instances in the compute environment, wherein the one or more additional jobs are added to the one or more queues during the window of time.

5. A computer-implemented method, comprising:
mapping one or more queues to a compute environment, wherein the compute environment is associated with a plurality of computing resources, wherein information usable to identify the one or more queues and identify the plurality of computing resources is provided by a client, wherein the computing resources are accessible for use in the compute environment by the client and disallowed for use by other clients for a window of time, and wherein data indicative of one or more jobs is added to the one or more queues and the one or more queues are mapped to the compute environment prior to the window of time opening and prior to adding the computing resources to the compute environment;
responsive to the window of time opening and while the one or more jobs are pending in the one or more queues, adding the computing resources to the compute environment, wherein the computing resources added are provisioned from a pool of available computing resources;
during the window of time, initiating execution of the one or more jobs from the one or more queues on at least one of the computing resources in the compute environment; and
after the window of time closes, removing the computing resources from the compute environment.

6. The method as recited in claim 5, wherein additional data indicative of one or more additional jobs is added to the one or more queues after the computing resources are removed from the compute environment and before the window of time opens additional computing resources are added to the compute environment.

7. The method as recited in claim 5, wherein additional data indicative of one or more additional jobs is added to the one or more queues during the window of time.

8. The method as recited in claim 5, wherein the at least one of the computing resources is provisioned and added to the compute environment based at least in part on an auto-launch policy implemented by a compute environment management system.

9. The method as recited in claim 5, further comprising:
based at least in part on analysis of the one or more queues, deprovisioning and removing at least one of the computing resources from the compute environment prior to the window of time closing.

10. The method as recited in claim 5, wherein the queues comprise a higher priority queue and a lower priority queue, wherein one or more jobs in the lower priority queue are assigned to one or more of the computing resources in the compute environment during the window of time and when the higher priority queue is empty.

11. The method as recited in claim 5, wherein the compute environment comprises a managed compute environment, wherein the managed compute environment is associated with one or more constraints for compute instances, including an indication of one or more compute instance types usable in the managed compute environment.

12. The method as recited in claim 5, wherein a multi-tenant provider network comprises the pool of available computing resources.

13. A non-transitory computer-readable storage medium storing program instructions computer-executable to perform:
mapping one or more queues to a compute environment, wherein the compute environment is associated with a plurality of reserved compute instances, wherein information usable to identify the one or more queues and identify the plurality of reserved compute instances is provided by a client, wherein the reserved compute instances are reserved for use in the compute environment by the client and disallowed for use by other clients for a window of time, and wherein data indicative of one or more jobs is added to the one or more queues prior to the window of time and prior to adding the reserved compute instances to the compute environment;

responsive to the window of time opening and while the one or more jobs are pending in the one or more queues, adding the reserved compute instances to the compute environment, wherein the reserved compute instances are provisioned from a pool of available compute instances;

during the window of time, initiating execution of one or more jobs from the one or more queues on at least one of the reserved compute instances in the compute environment; and after the window of time closes, removing the reserved compute instances from the compute environment.

14. The computer-readable storage medium as recited in claim 13, wherein the program instructions are further computer-executable to perform:

during the window of time, initiating execution of one or more additional jobs from the one or more queues on the at least one of the reserved compute instances in the compute environment, wherein data indicative of the one or more additional jobs is added to the one or more queues during the window of time.

15. The computer-readable storage medium as recited in claim 13, wherein additional data indicative of one or more additional jobs is added to the one or more queues after the reserved compute instances are removed from the compute environment and before additional reserved compute instances are added to the compute environment.

16. The computer-readable storage medium as recited in claim 13, wherein the at least one of the reserved compute instances is provisioned and added to the compute environment based at least in part on an auto-launch policy implemented by a compute environment management system.

17. The computer-readable storage medium as recited in claim 13, wherein the program instructions are further computer-executable to perform:

based at least in part on analysis of the one or more queues, deprovisioning and removing at least one of the reserved compute instances from the compute environment prior to the window of time closing.

18. The computer-readable storage medium as recited in claim 13, wherein the queues comprise a higher priority queue and a lower priority queue, wherein one or more jobs in the lower priority queue are assigned to one or more of the reserved compute instances in the compute environment during the window of time and when the higher priority queue is empty.

19. The computer-readable storage medium as recited in claim 13, wherein the compute environment comprises a managed compute environment, wherein the managed compute environment is associated with one or more constraints for compute instances, including an indication of one or more compute instance types usable in the managed compute environment.

20. The computer-readable storage medium as recited in claim 13, wherein a multi-tenant provider network comprises the pool of available compute instances.

* * * * *